United States Patent
Miyoshi et al.

(10) Patent No.: US 9,313,492 B2
(45) Date of Patent: Apr. 12, 2016

(54) DEVICE AND METHOD FOR MOVING IMAGE ENCODING

(71) Applicant: FUJITSU LIMITED, Kawasaki-shi, Kanagawa (JP)

(72) Inventors: Hidenobu Miyoshi, Kawasaki (JP); Hisanari Kimura, Kasuga (JP); Shotaro Ishikawa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 452 days.

(21) Appl. No.: 13/853,322

(22) Filed: Mar. 29, 2013

(65) Prior Publication Data

US 2013/0343458 A1    Dec. 26, 2013

(30) Foreign Application Priority Data

Jun. 22, 2012 (JP) ................. 2012-140589

(51) Int. Cl.
*H04N 7/12* (2006.01)
*H04N 19/51* (2014.01)
*H04N 19/52* (2014.01)

(52) U.S. Cl.
CPC ......... *H04N 19/00587* (2013.01); *H04N 19/52* (2014.11)

(58) Field of Classification Search
USPC .................................... 375/240.16
See application file for complete search history.

(56) References Cited

U.S. PATENT DOCUMENTS

| 2004/0028282 | A1* | 2/2004 | Kato et al. ............... 382/236 |
| 2007/0047652 | A1* | 3/2007 | Maruyama et al. ...... 375/240.16 |
| 2008/0225956 | A1 | 9/2008 | Kusakabe |
| 2009/0310682 | A1 | 12/2009 | Chono |
| 2012/0269268 | A1* | 10/2012 | Kim et al. ............... 375/240.16 |
| 2012/0275518 | A1* | 11/2012 | Kadono et al. .......... 375/240.14 |

FOREIGN PATENT DOCUMENTS

| JP | 2006-94081 | 4/2006 |
| JP | 2006-197521 | 7/2006 |
| WO | WO 2007/105590 A1 | 9/2007 |

* cited by examiner

*Primary Examiner* — Tracy Li
(74) *Attorney, Agent, or Firm* — Oblon, McClelland, Maier & Neustadt, L.L.P.

(57) ABSTRACT

A moving image encoding device includes a processor; and a memory which stores a plurality of instructions, which when executed by the processor, cause the processor to execute, obtaining a region motion vector that represents a motion of a region including a block in a first slice, in a case where an encoding object block is included in a block line in a second slice, the block line contacting with a boundary between the first slice and the second slice in an encoding object picture, the encoding object picture being divided into a plurality of slices each of which includes a plurality of blocks; obtaining a motion vector of the encoding object block by using the region motion vector as a first prediction vector of the encoding object block; obtaining a second prediction vector from a motion vector of one or more encoded blocks; and obtaining an encoding result.

21 Claims, 21 Drawing Sheets

DEVICE AND METHOD FOR MOVING IMAGE ENCODING

CROSS-REFERENCE TO RELATED APPLICATION(S)

This application is based upon and claims the benefit of priority of the prior Japanese Patent Application No. 2012-140589, filed on Jun. 22, 2012, the entire contents of which are incorporated herein by reference.

FIELD

The embodiment discussed herein is related to a moving image encoding device, a moving image encoding method, and a computer-readable storage medium which stores a moving image encoding program.

BACKGROUND

When image data is transmitted from a transmission device to a reception device or when image data is stored in a storage device, for example, highly-efficiency encoding of the image data is performed due to the high data amount of the image data. Here, "high-efficiency encoding" represents encoding processing in which a certain data sequence is converted into another data sequence, that is, processing to compress the data amount of the data sequence. Especially, moving image data is often subject to high-efficiency encoding.

The H.264/AVC standard is widely used as typical moving image encoding algorithm, for example. The H.264/AVC standard is encoding algorithm which is defined in H.264 of International Telecommunication Union Telecommunication Standardization Sector (ITU-T). The H.264/AVC standard is defined in Moving Picture Experts Group phase 4 Advanced Video Coding (MPEG-4 AVC) of International Organization for Standardization (ISO)/International Electrotechnical Commission (IEC), as well.

Examples of moving picture data mainly include data of which a constituent unit is only a flame and data of which a constituent unit is a field. A constituent unit of moving image data is called a picture. As moving image encoding, there is a case where one picture is divided into a plurality of blocks so as to form a slice including a plurality of blocks. One block is composed of n×m pieces of pixels and one picture is divided into one or more slices. n and m are integers which are 4 or larger and thus, a block of 16×16 pixels is often used. In the H.264/AVC standard, this block is called a macro block.

Prediction encoding is widely used as moving image encoding algorithm. Intra-picture prediction (intra prediction) coding is used as typical prediction encoding. Intra prediction encoding utilizes high correlativity of moving image data in a spatial direction, so that data of other coded pictures are not used. Accordingly, regarding a picture which has undergone intra prediction encoding, an original image may be restored only by information in the picture.

Further, prediction is performed by using high correlativity of moving image data in a temporal direction, in inter-picture prediction (inter prediction) coding. Moving image data often has a high degree of similarity between picture data on certain timing and picture data on the following timing, so that this property is used in inter prediction encoding.

In inter prediction encoding, an encoding object picture which is an original image is divided into a plurality of blocks and a decode image of an encoded reference picture is referred in a block unit so as to select a region similar to an encoding object block through block matching. Subsequently, a difference between pixel values of the similar region and the encoding object block (pixel difference) is obtained and redundancy is removed. Then, information of a motion vector indicating the similar region and the pixel difference from which redundancy is removed are encoded, realizing high-efficiency encoding with a high compression rate.

For example, in a data transmission system which employs inter prediction encoding, a transmission device encodes information of a motion vector which indicates a "motion" from a previous picture to an encoding object picture. Further, the transmission device encodes a pixel difference between a prediction image, which is generated from the previous picture by using the motion vector, of the encoding object picture and an original image of the encoding object picture. Then, the transmission device transmits the encoded information of the motion vector and the encoded pixel difference to a reception device. On the other hand, the reception device restores the original image of the encoding object picture on the basis of the information of the motion vector and the pixel difference that are received.

A moving image encoding device which is employed in such transmission device or the like transmits a picture which is subjected to intra prediction encoding in a regular cycle by using the group of pictures (GOP) configuration and performs inter prediction encoding with respect to the rest of pictures to transmit the pictures. In the GOP configuration, three kinds of pictures which are an I picture, a P picture, and a B picture which correspond to prediction algorithm are defined. An I picture is a picture which is encoded through intra prediction encoding which enables restoration of an original image only with information in the picture without referring to other pictures. A P picture and a B picture are pictures which are encoded mainly through inter prediction encoding.

A P picture is a picture which is obtained by performing forward inter-picture prediction from past reference pictures and encoding a pixel difference (prediction error). A B picture is a picture which is obtained by performing bidirectional inter-picture prediction from past and future reference pictures and encoding a prediction error. A future picture is used for prediction to obtain a B picture, so that a future reference picture which is to be used for prediction is encoded before encoding of the B picture and decoded.

Inter prediction encoding is now described in detail. Taking the H.264/AVC standard as an example, a macro block is divided into a plurality of sub blocks which are smaller than the macro block and a sub block or a macro block is set as an encoding object block. There are various inter prediction modes depending on a shape of a sub block. In inter prediction, reference indexes are assigned for a plurality of decode images which are reference destinations and a reference index, a motion vector, and a pixel difference are obtained in a sub block unit.

As information, which is to be encoded, of a motion vector, a difference vector between a prediction vector, as which a motion vector of a peripheral macro block is used, and a motion vector which is obtained by block matching is used. This difference vector is decreased as much as possible, being able to enhance encoding efficiency.

In the H.264/AVC standard, a skip encoding mode which is an implicit inter prediction mode is used so as to further enhance a compression rate. In the skip encoding mode, it is possible to decode an original image without transmitting information of a reference index, a motion vector, and a pixel difference.

For example, in a case of a P picture, a PSKIP mode is widely used. In the PSKIP mode, a reference index is invariably set to 0, a skip vector which is predicted from a motion vector of a peripheral macro block is used as a motion vector, and a pixel difference is set to 0, thus performing encoding. In a case of a B picture, a BSKIP mode is used in a similar manner to the PSKIP mode and further, a direct mode in which only information of a pixel difference is transmitted without transmitting information of a motion vector is used as well.

In the H.264/AVC standard, there is a case where one picture is divided into a plurality of slices so as to conform a defined profile. Examples of such profile in which slice division is defined include a High 10 profile and a High 422 profile. For example, in an example of slice division depicted in FIG. 1, a picture of 1920×1088 pixels is divided into four slices.

When a macro block of 16×16 pixels is used, the picture of FIG. 1 is divided into 68 pieces of horizontal direction block lines and slices 101 to 104 respectively include 17 block lines. Head block lines of the slices 101 to 104 are block lines 111 to 114 respectively. Here, the number of slices in a picture is not limited to four, but the number may be an integer of two or larger and may satisfy a restriction of a profile. Further, slice division may not be performed in a block line unit, but slice division is often performed in a block line unit commonly.

In a case where prediction encoding is performed by using a slice-divided picture as an encoding object, information of another slice is prohibited from being used when prediction is performed by using information of a region which has already been encoded in a certain slice in a picture.

A calculation method of a prediction vector and a skip vector in the H.264/AVC standard is now described with a specific example.

A method for calculating a prediction vector of a P picture is first described. A past reference picture candidate list is called List0 and a future reference picture candidate list is called List1. A reference picture candidate list includes one or more reference indexes which designate a reference picture which is to be a reference candidate. In inter prediction of a P picture, only the List0 is used.

When a reference index refIdx of an encoding object block is determined, a prediction vector mvp of the encoding object block is obtained by using a reference picture which is designated by refIdx. Though a prediction method changes depending on a shape of a sub block, median prediction which is used in a macro block of 16×16 pixels is described here.

In the median prediction, a prediction vector of an encoding object block 201 is obtained by using motion vectors of a macro block A, a macro block B, and a macro block C which are peripheral to the encoding object block 201 and have already been encoded, as depicted in FIG. 2. Reference indexes indicating respective reference pictures of the macro block A, the macro block B, and the macro block C are denoted as refIdxA, refIdxB, and refIdxC respectively. Further, motion vectors of the macro block A, the macro block B, and the macro block C are denoted as mvA, mvB, and mvC respectively. In this case, a prediction vector mvp of an encoding object block is obtained as following.

Step 1: When all of the macro block A, the macro block B, and the macro block C are not available, mvp=0.

Step 2: When the macro block B and the macro block C are not available and the macro block A is available, refIdxB of the macro block B and refIdxC of the macro block C are handled as refIdx equal to refIdxA of the macro block A. Further, mvB of the macro block B and mvC of the macro block C are handled as my equal to mvA of the macro block A. Further, mvA which is a median value of mvA, mvB, and mvC is assigned for mvp.

Step 3: When only one of refIdxA of the macro block A, refIdxB of the macro block B, and refIdxC of the macro block C is equal to refIdx, a motion vector of a macro block which is represented by the reference index is assigned for mvp.

Step 4: When any of step 1 to step 3 does not correspond, a median value of mvA, mvB, and mvC is assigned for mvp.

When prediction encoding is performed by using a slice-divided picture as an encoding object, a macro block existing in the outside of a slice to which the encoding object block 201 belongs is not available because information of another slice is prohibited from being used. Accordingly, when the macro block B and the macro block C belong to another slice, these macro blocks are not available.

A calculation method of a skip vector in the PSKIP mode is now described. 0 is used as a reference index refIdx of an encoding object block. When any of following conditions of still determination is true, both components of a skip vector mvskip which is a motion vector of the encoding object block are set to 0.

(1) The macro block A is not available.
(2) The macro block B is not available.
(3) refIdxA of the macro block A is 0 and both components of mvA are 0.
(4) refIdxB of the macro block B is 0 and both components of mvB are 0.

When any one of the above-mentioned conditions (1) to (4) is not true, a prediction vector is assigned for a skip vector mvskip. Accordingly, when a motion vector of a peripheral macro block is not a zero vector, the corresponding region is not determined as a still region and a non-zero prediction vector is assigned as a skip vector.

In the skip encoding mode, an amount of information used for encoding may be minimized when an encoding object block expresses a motion similar to that of peripheral macro blocks. However, information of another slice is prohibited from being used in the skip encoding mode as well, so that the macro block B is not available when the macro block B belongs to another slice.

Regarding a moving image encoding technique, International Publication Pamphlet No. WO 2007/105590 discloses a method for determining whether or not a skip mode is effective as an encoding mode of a block by using a correction value based on a motion vector of a skip mode.

SUMMARY

In accordance with an aspect of the embodiments, a moving image encoding device includes a processor; and a memory which stores a plurality of instructions, which when executed by the processor, cause the processor to execute, obtaining a region motion vector that represents a motion of a region including a block in a first slice, in a case where an encoding object block is included in a block line in a second slice, the block line contacting with a boundary between the first slice and the second slice in an encoding object picture, the encoding object picture being divided into a plurality of slices each of which includes a plurality of blocks; obtaining a motion vector of the encoding object block by using the region motion vector as a first prediction vector of the encoding object block; obtaining a second prediction vector from a motion vector of one or more encoded blocks that is or are positioned around the encoding object block; and obtaining an encoding result by encoding a difference vector between the motion vector of the encoding object block and the second prediction vector and encoding a difference between a pixel value of the encoding object block and a pixel value of a block in a reference picture that is represented by the motion vector of the encoding object block.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which.

DESCRIPTION OF EMBODIMENT

Figure 3:
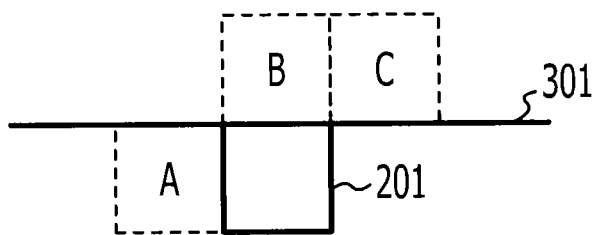
FIG. 3 illustrates median prediction immediately below a slice boundary.

An embodiment is described in detail below with reference to the accompanying drawings. As depicted in FIG. 3, when a block line including the encoding object block 201 is positioned immediately below a slice boundary 301, a prediction vector of a P picture is calculated through the above-described median prediction of step 1 to step 4.

If the encoding object block 201 is a leftmost block of the block line, a macro block A does not exist. Further, since information of a slice positioned on the upper side of the slice boundary 301 is prohibited from being used in inter prediction encoding, as well, a macro block B and a macro block C are not available. This case corresponds to the step 1 described above and a prediction vector is a zero vector (mvp=0).

In a case where the encoding object block 201 is not a leftmost block, the macro block A exists and the macro block B and the macro block C are not available, so that a prediction vector is equal to a motion vector of the macro block A (mvp=mvA).

Figure 4:
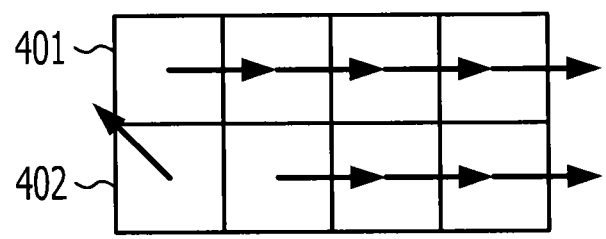
FIG. 4 illustrates a motion trend of a macro block.

FIG. 4 illustrates a motion trend of each macro block in a case where a motion different from motions of peripheral macro blocks arises in a leftmost macro block in a certain block line. Motions of respective macro blocks of a block line 401 are similar to each other and motions of macro blocks other than a leftmost macro block of a block line 402 are also similar to those of the block line 401. However, a motion of the leftmost macro block of the block line 402 is different from that of the block line 401.

Figure 5:
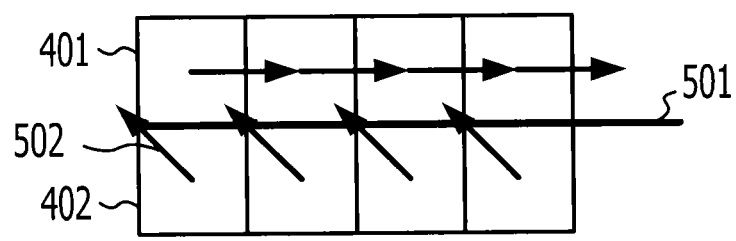
FIG. 5 illustrates a prediction vector of a macro block.

FIG. 5 illustrates a prediction vector of each macro block in a case where a slice boundary 501 is present between the block line 401 and the block line 402 of FIG. 4. In this case, each prediction vector of the block line 401 represents a motion to which an actual motion trend is reflected.

However, motion vectors of the block line 401 which belongs to a different slice are not available in the bloke line 402, corresponding to the above-described step 2. Accordingly, a motion vector of a macro block on the immediate left is employed as a prediction vector. As a result, a prediction vector 502 of the leftmost macro block propagates to right side macro blocks in series and thus, a motion different from an actual motion trend is encoded.

Further, in the PSKIP mode, a skip vector is calculated on the basis of the above-described still determination of (1) to (4). In a case where an encoding object block is positioned immediately below a slice boundary, this case corresponds to the above-described condition (2) "the macro block B is not available" and a skip vector is a zero vector. As a result, skip vectors of all macro blocks are zero vectors in the block line 402 which is positioned immediately below the slice boundary 501 and a motion different from an actual motion trend is encoded.

Thus, reduction of a difference vector between a prediction vector and a motion vector and selection of a skip encoding mode enable enhancement of encoding efficiency, but there is a possibility that a motion different from an actual motion trend is encoded immediately below a slice boundary. In this case, trends of encoding errors on the upper side and the lower side of the slice boundary are different from each other, so that subjective image quality is deteriorated and a slice boundary is clearly visually recognized. Accordingly, moving image encoding algorithm by which a slice boundary is hardly visually recognized is desired.

Figure 6:
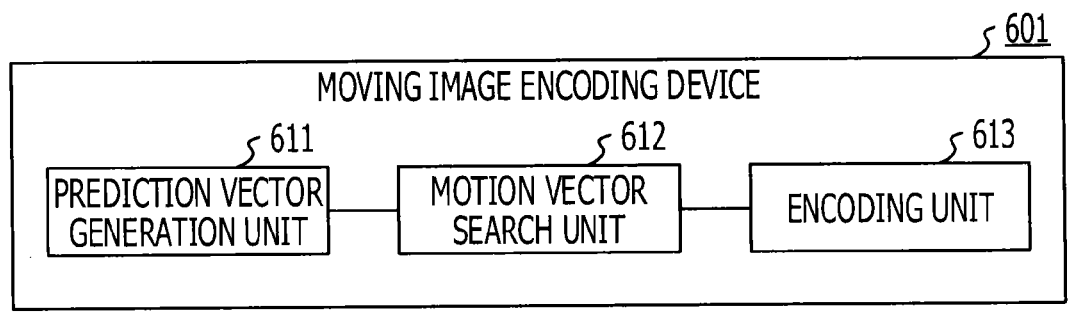
FIG. 6 is a configuration diagram of a first moving image encoding device.
Figure 7:
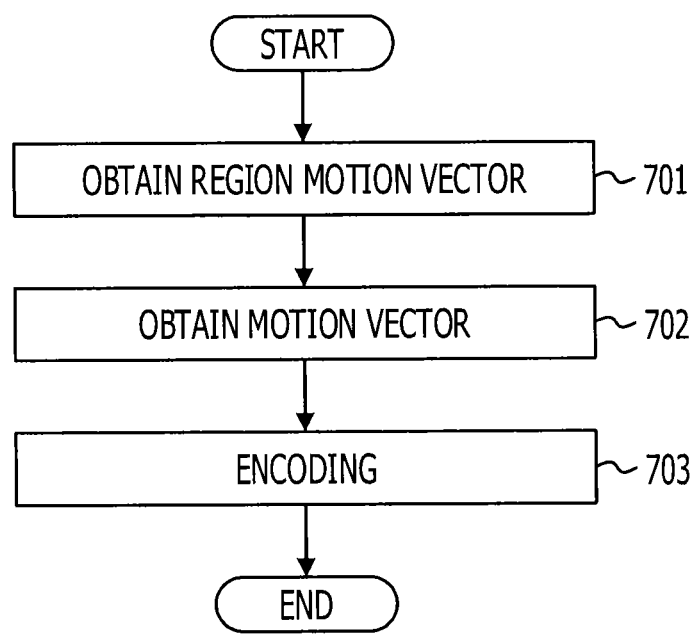
FIG. 7 is a flowchart of moving image encoding processing.

FIG. 6 illustrates a configuration example of a moving image encoding device according to the embodiment. FIG. 7 is a flowchart illustrating an example of moving image encoding processing which is performed by the moving image encoding device of FIG. 6. A moving image encoding device 601 of FIG. 6 includes a prediction vector generation unit 611, a motion vector search unit 612, and an encoding unit 613. An encoding object picture is divided into a plurality of slices, each of which includes a plurality of blocks, to include a first slice and a second slice.

When an encoding object block is included in a block line, which contacts with a boundary between the first slice and the second slice, in the second slice, the prediction vector generation unit 611 obtains a region motion vector which represents a motion of a region including blocks in the first slice (step 701). Then, the prediction vector generation unit 611 outputs the region motion vector as a first prediction vector.

The motion vector search unit 612 obtains a motion vector of the encoding object block by using the first prediction vector as a prediction vector of the encoding object block (step 702).

The encoding unit 613 obtains a second prediction vector on the basis of motion vectors of one or more encoded blocks in the periphery of the encoding object block (step 703). Subsequently, the encoding unit 613 encodes a difference vector between the motion vector of the encoding object block and the second prediction vector so as to encode a difference between a pixel value of the encoding object block and a pixel value of a block in a reference picture which is represented by the motion vector of the encoding object block. Then, the encoding unit 613 outputs an encoding result.

Thus, the moving image encoding device of FIG. 6 is capable of performing moving image encoding, in which a slice boundary is hardly visibly recognized, by using a slice-divided picture as an encoding object.

Specific examples of the configuration and an operation of the moving image encoding device of FIG. 6 are now described with reference to FIGS. 8 to 20. For the sake of simplicity, a case where an encoding object picture is a P picture in moving image encoding of the H.264/AVC standard is described as an example below. However, the similar configuration is applicable to a case of moving image encoding of a standard other than the H.264/AVC standard or a case where an encoding object picture is a B picture.

Figure 8:
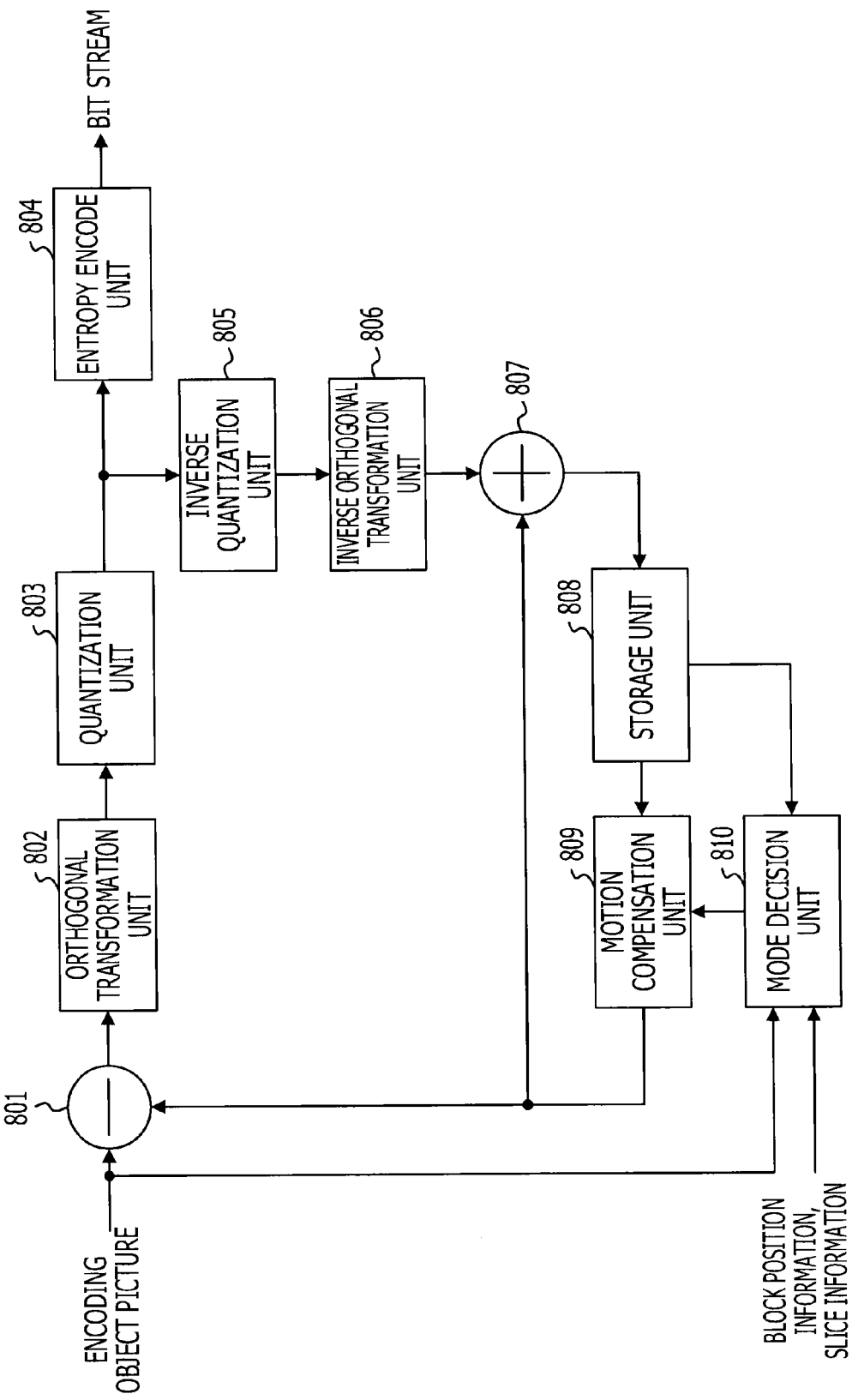
FIG. 8 is a configuration diagram of a second moving image encoding device.

FIG. 8 illustrates a further detailed configuration example of the moving image encoding device of FIG. 6. A moving image encoding device of FIG. 8 is permitted to be implemented as a hardware circuit, for example and includes a prediction error generation unit 801, an orthogonal transformation unit 802, a quantization unit 803, an entropy encode unit 804, an inverse quantization unit 805, an inverse orthogonal transformation unit 806, and a decode image generation unit 807. The moving image encoding device of FIG. 8 further includes a storage unit 808, a motion compensation unit 809, and a mode decision unit 810.

The prediction error generation unit 801 divides image data of an inputted encoding object picture into a plurality of blocks so as to generate a prediction error signal indicating a difference between block data of an encoding object block and block data (prediction signal) of a prediction image which is outputted from the motion compensation unit 809. Then, the prediction error generation unit 801 outputs the generated prediction error signal to the orthogonal transformation unit 802.

The orthogonal transformation unit 802 orthogonally transforms an inputted prediction error signal so as to output a signal, which is separated into frequency components of a horizontal direction and a vertical direction, of a frequency region to the quantization unit 803. The quantization unit 803 quantizes an inputted signal of a frequency region so as to reduce an information amount of the signal and output a quantization result to the entropy encode unit 804 and the inverse quantization unit 805.

The inverse quantization unit 805 inversely quantizes a quantization result so as to output the inverse quantization result to the inverse orthogonal transformation unit 806. The inverse orthogonal transformation unit 806 inversely orthogonal-transforms the inverse quantization result so as to output a signal of a time region to the decode image generation unit 807. Decode processing is performed by the inverse quantization unit 805 and the inverse orthogonal transformation unit 806, providing a signal corresponding to a prediction error signal before encoding.

The decode image generation unit 807 adds block data of a prediction image which is outputted from the motion compensation unit 809 and a signal which is outputted from the inverse orthogonal transformation unit 806 so as to reproduce block data of an encoding object block and output the block data to the storage unit 808. The storage unit 808 stores inputted reproduction block data as block data of a new reference picture. This block data of the reference picture is referred by the motion compensation unit 809 and the mode decision unit 810.

The mode decision unit 810 decides encoding information which is used for encoding on the basis of image data of an encoding object picture, slice information indicating the slice configuration of the encoding object picture, and block position information indicating a position of the encoding object block. The slice information may be information which is preliminarily designated or information which is designated in accordance with change of the slice configuration. The slice information and the block position information are outputted from the prediction error generation unit 801 or an encoding control unit, which is not depicted, to the mode decision unit 810, for example.

Encoding information includes information of an encoding mode, a reference index, a motion vector, and the like. A motion vector is information of a vector indicating spatial replacement in a block unit and is obtained by searching the most similar region to an encoding object block within a reference picture through block matching between an encoding object picture and the reference picture.

The motion compensation unit 809 carries out motion compensation of block data of a reference picture, which is stored in the storage unit 808, by a motion vector in accordance with encoding information which is decided by the mode decision unit 810. Then, the motion compensation unit 809 generates a prediction signal of an encoding object block by using the block data of the reference picture which is subjected to the motion compensation, so as to output the prediction signal to the prediction error generation unit 801 and the decode image generation unit 807.

The entropy encode unit 804 obtains a prediction vector on the basis of motion vectors of one or more encoded blocks positioned in the periphery of the encoding object block.

Figure 2:
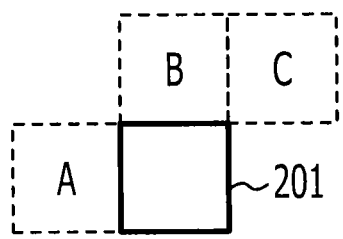
FIG. 2 illustrates median prediction.

For example, in a case of the above-described P picture, a prediction vector mvp of the encoding object block 201 is obtained by using motion vectors of the block A, the block B, and the block C depicted in FIG. 2, as following.

Step 1: When all of the block A, the block B, and the block C are not available, mvp=0.

Step 2: When the block B and the block C are not available and the block A is available, refIdxB of the block B and refIdxC of the block C are handled as refIdx equal to refIdxA of the block A. Further, mvB of the block B and mvC of the block C are handled as my equal to mvA of the block A. Then, mvA which is a median value of mvA, mvB, and mvC is assigned for mvp.

Step 3: When only one of refIdxA of the block A, refIdxB of the block B, and refIdxC of the block C is equal to refIdx, a motion vector of a block which is represented by the reference index is assigned for mvp.

Step 4: When any of step 1 to step 3 does not correspond, a median value of mvA, mvB, and mvC is assigned for mvp.

Then, the entropy encode unit 804 obtains a difference vector between a motion vector and a prediction vector which are decided by the mode decision unit 810 so as to perform entropy encoding with respect to the difference vector and a quantization result which is outputted from the quantization unit 803. Entropy encoding is an example of variable length coding for assigning a variable length code in response to an appearance frequency of a symbol. Then, the entropy encode unit 804 outputs an encoding result as a bit stream.

The configuration diagram depicted in FIG. 8 is merely an example and part of constituent elements may be omitted or altered depending on processing performed by the moving image encoding device.

Figure 9:
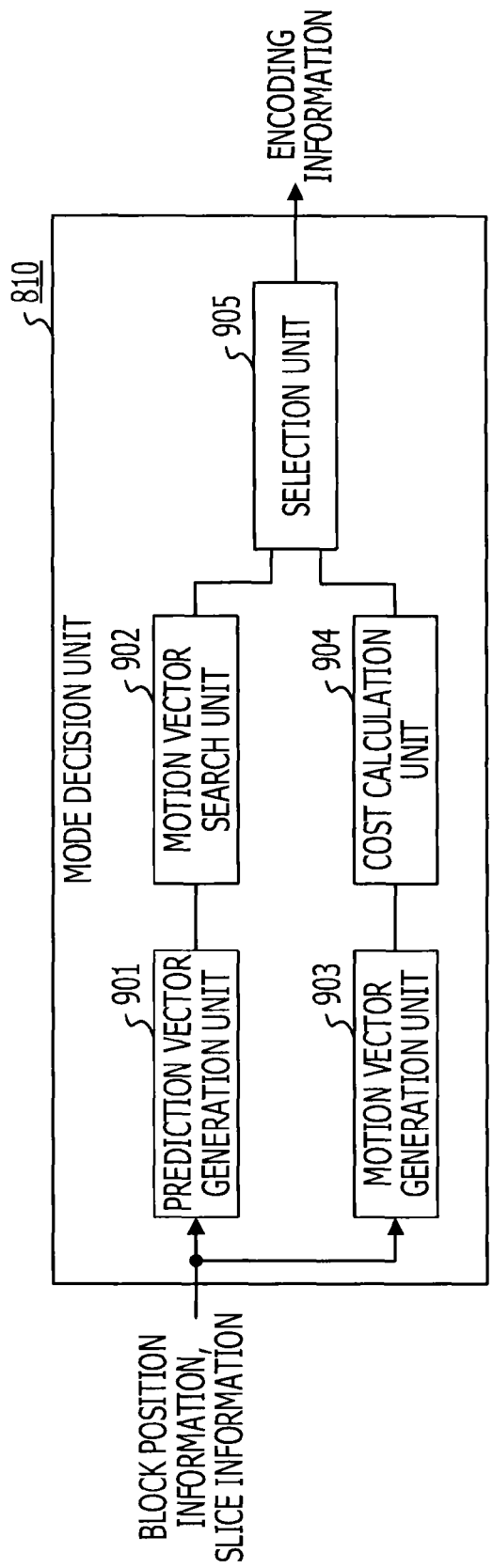
FIG. 9 is a configuration diagram of a first mode decision unit.

FIG. 9 illustrates a configuration example of the mode decision unit 810 of FIG. 8. The mode decision unit 810 of FIG. 9 includes a prediction vector generation unit 901, a motion vector search unit 902, a motion vector generation unit 903, a cost calculation unit 904, and a selection unit 905.

The prediction vector generation unit 901 obtains a prediction vector which is used in motion vector search of an encoding object block which is designated by block position information, on the basis of block position information and slice information and outputs the prediction vector to the motion vector search unit 902. The motion vector search unit 902 performs block matching between an encoding object picture and a reference picture and calculates an encoding cost of an encoding object block on the basis of a prediction vector so as to decide a motion vector.

The motion vector generation unit 903 obtains a skip vector which is a motion vector of an encoding object block in a skip encoding mode, on the basis of block position information and slice information. The cost calculation unit 904 calculates an encoding cost of an encoding object block in the skip encoding mode, on the basis of a skip vector.

An encoding cost which is calculated by the motion vector search unit 902 corresponds to an encoding cost in a motion search (ME) encoding mode in which a difference vector is encoded. This encoding cost is referred to as a ME cost below. On the other hand, an encoding cost which is calculated by the cost calculation unit 904 corresponds to an encoding cost in a skip encoding mode in which a difference vector is not encoded. This encoding cost is referred to as a skip cost below.

The selection unit 905 compares an ME cost to a skip cost and selects an encoding mode of which an encoding cost is smaller, so as to output encoding information of the selected encoding mode. When the ME encoding mode is selected, encoding information including a motion vector which is determined by the motion vector search unit 902 is outputted. When the skip encoding mode is selected, encoding information including a skip vector which is obtained by the motion vector generation unit 903 is outputted.

Figure 10:
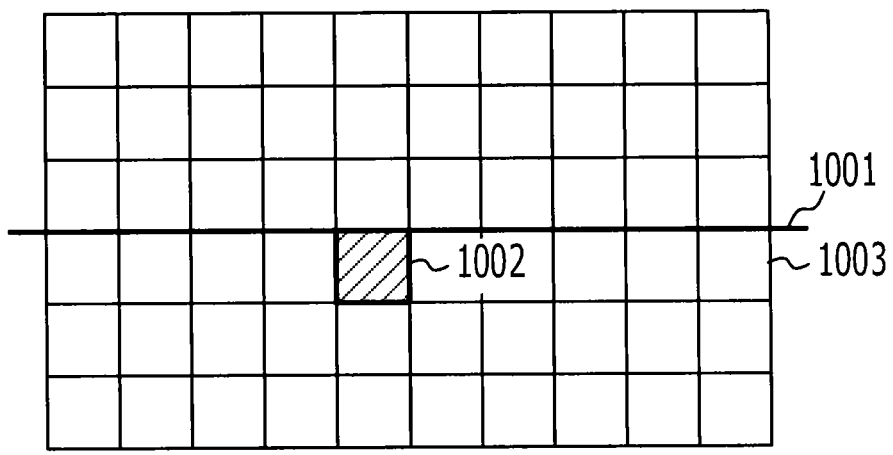
FIG. 10 illustrates a positional relationship between a slice boundary and an encoding object block.

FIG. 10 illustrates an example of a positional relationship between a slice boundary and an encoding object block. When an encoding object picture is divided into a plurality of slices by a horizontal boundary line, a horizontal slice boundary 1001 is present between slices on an upper side and a lower side.

Here, when an encoding object block 1002 belongs to a horizontal block line 1003 positioned immediately below the slice boundary 1001, a prediction vector in the ME encoding mode is equal to a motion vector of a left side encoded block, as described above. Accordingly, when the motion vector of the left side encoded block is not similar to motion vectors of blocks positioned in the periphery of the encoding object block 1002, the motion vector of the left side encoded block is not an effective prediction vector.

Further, when the encoding object block 1002 belongs to the block line 1003, a skip vector in the skip encoding mode is mandatorily set to a zero vector. Accordingly, unless motion vectors of blocks positioned around the encoding object block 1002 are zero vectors, the skip encoding mode is not an effective encoding mode.

Therefore, when an encoding object block belongs to a block line positioned immediately below a slice boundary, the prediction vector generation unit 901 obtains an effective prediction vector and outputs the prediction vector to the motion vector search unit 902, being able to obtain a suitable ME cost. Search of a motion in a wide region over a slice boundary enables acquisition of an effective prediction vector, permitting the selection unit 905 to select a suitable encoding mode on the basis of a suitable ME cost.

Figure 11:
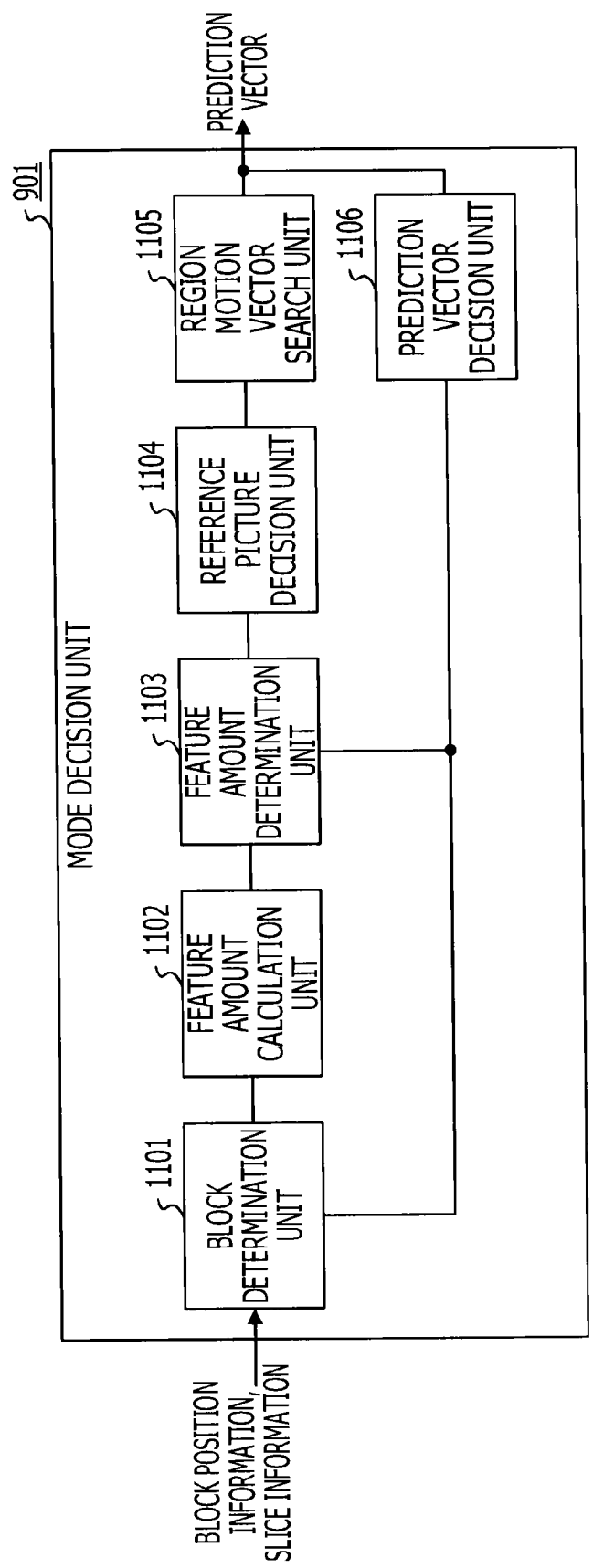
FIG. 11 is a configuration example of a first prediction vector generation unit.

FIG. 11 illustrates a configuration example of the prediction vector generation unit 901 of FIG. 9. The prediction vector generation unit 901 of FIG. 9 includes a block determination unit 1101, a feature amount calculation unit 1102, a feature amount determination unit 1103, a reference picture decision unit 1104, a region motion vector search unit 1105, and a prediction vector decision unit 1106.

The block determination unit 1101 determines a position on which a slice boundary is present among a plurality of block lines which are included in an encoding object picture, on the basis of slice information. Then, the block determination unit 1101 determines whether or not an encoding object block which is on a position indicated by block position information belongs to any block line positioned immediately below the slice boundary and outputs the determination result to the feature amount calculation unit 1102 and the prediction vector decision unit 1106.

Here, slice information may be flag information indicating whether or not each block in an encoding object picture belongs to a block line positioned immediately below a slice boundary, instead of indicating the slice configuration.

When an encoding object block belongs to a block line positioned immediately below a slice boundary, the feature amount calculation unit 1102 obtains a feature amount of the encoding object block. Then, the feature amount determination unit 1103 determines whether or not a texture of the encoding object block is present by comparing a feature amount with a threshold value and outputs the determination result to the reference picture decision unit 1104 and the prediction vector decision unit 1106.

As a feature amount of an encoding object block, a value indicating whether a texture existing in the encoding object block is dark or light, for example, is used. In a block of which a texture is light such as an image of lawn, for example, a cost dependent on a pixel difference hardly arises between an encoding object block and a reference picture. Therefore, an encoding mode is more likely to be decided on the basis of only a cost for encoding of a motion vector, easily causing erroneous determination.

On the other hand, in a block of which a texture is dense, a suitable cost dependent on a pixel difference arises, hardly causing erroneous determination. There is also a case where only blocks positioned around an encoding object block are moving and the encoding object block remains still, so that it is considered that motion in a wide region over a slice boundary does not have to be searched also for the encoding object block in which erroneous determination hardly occurs. Therefore, when a texture of an encoding object block is dense, a prediction vector is obtained only on the basis of information in a slice.

A feature amount ACT of an encoding object block is calculated by the following formula, for example.

$$ACT = \Sigma |Pixel - AvePixel| \qquad (1)$$

Pixel of the formula (1) denotes a pixel value of each pixel in the encoding object block, AvePixel denotes an average value of pixel values of all pixels in the encoding object block, and Σ denotes a sum of all pixels in the encoding object block. Accordingly, ACT of the formula (1) denotes a difference absolute value sum of a pixel value and an average value of respective values in the encoding object block, being able to be used as an index representing dispersion of pixel values in the encoding object block.

Further, an intensity of an edge in the encoding object block may be used as the feature amount ACT. For example, an edge detection filter such as a sobel filter is applied to the encoding object block, being able to detect an edge.

When a sobel filter of 3×3 pixels is used, a pixel value P of an application region of the filter of 3×3 pixels, a filter coefficient Y of a vertical edge extraction filter, and a filter coefficient X of a horizontal edge extraction filter are expressed as the following formula.

$$P = \begin{bmatrix} a & b & c \\ d & e & f \\ g & h & i \end{bmatrix} \quad (2)$$

$$Y = \begin{bmatrix} -1 & 0 & 1 \\ -2 & 0 & 2 \\ -1 & 0 & 1 \end{bmatrix}$$

$$X = \begin{bmatrix} -1 & -2 & -1 \\ 0 & 0 & 0 \\ 1 & 2 & 1 \end{bmatrix}$$

A horizontal filtering result dy using the filter coefficient Y is expressed as following.

$$dy = P*Y = -a-2d-g+c+2f+i \quad (3)$$

Further, a vertical filtering result dx using the filter coefficient X is expressed as following.

$$dx = P*X = -a-2b-c+g+2h+i \quad (4)$$

An intensity Amp of an edge is calculated by the following formula by using the filtering results of the formulas (3) and (4).

$$Amp = \sqrt{dx^2 + dy^2} \quad (5)$$

Further, the feature amount ACT is calculated by the following formula.

$$ACT = \Sigma Amp \quad (6)$$

Σ of the formula (6) denotes a sum for all pixel positions in the encoding object block.

The feature amount determination unit 1103 compares a feature amount ACT with a threshold value TH. When ACT is equal to or larger than TH, the feature amount determination unit 1103 determines that a texture is present in the encoding object block. When ACT is smaller than TH, the feature amount determination unit 1103 determines that a texture is not present in the encoding object block.

When it is determined that a texture is not present in the encoding object block, the reference picture decision unit 1104 and the region motion vector search unit 1105 obtain a region motion vector representing a motion in a wide region over a slice boundary, as a prediction vector. On the other hand, when the encoding object block does not belong to a block line positioned immediately below the slice boundary, or when it is determined that a texture is present in the encoding object block, the prediction vector decision unit 1106 obtains a prediction vector on the basis only of information in the slice.

In a case where a plurality of candidates of a reference picture are present, region motion vectors for all of the candidates may be obtained when a region motion vector is obtained. In this case, the reference picture decision unit 1104 may be omitted. However, when a region motion vector is obtained in a block unit, it is possible to select a reference picture by using information of peripheral blocks which have already been encoded.

Therefore, when it is determined that a texture is not present in the encoding object block, the reference picture decision unit 1104 decides a suitable reference picture which is to be used for search of a region motion vector and outputs the reference picture to the region motion vector search unit 1105.

For example, in the encoding object block 201 depicted in FIG. 3, it is effective to select a reference picture which is selected most frequent times among the reference pictures which are selected respectively in the block A, the block B, and the block C which are positioned in the periphery of the encoding object block 201. A reference picture which is selected in peripheral blocks is more likely to be selected in encoding of the encoding object block. Therefore, a use of the same reference picture induces the motion vector search unit 902 to decide a reference index and a motion vector. Accordingly, motion trends around a slice boundary become uniform, being able to suppress image quality deterioration.

The reference picture decision unit 1104 may select a reference picture which is temporally closest to the encoding object picture.

The region motion vector search unit 1105 searches a region motion vector by using a decided reference picture. At this time, the region motion vector search unit 1105 obtains a motion vector representing a motion of a motion trend block as a region motion vector, while considering a wide region over a slice boundary in the periphery of the encoding object block as one search block (motion trend block). Then, the region motion vector search unit 1105 outputs the obtained region motion vector as a prediction vector to the motion vector search unit 902.

A motion trend block includes one or more blocks in another slice which is positioned above a slice boundary and an encoding object block. A motion trend block may also include a block which is in the same slice as that of an encoding object block and is other than the encoding object block.

Figure 12:
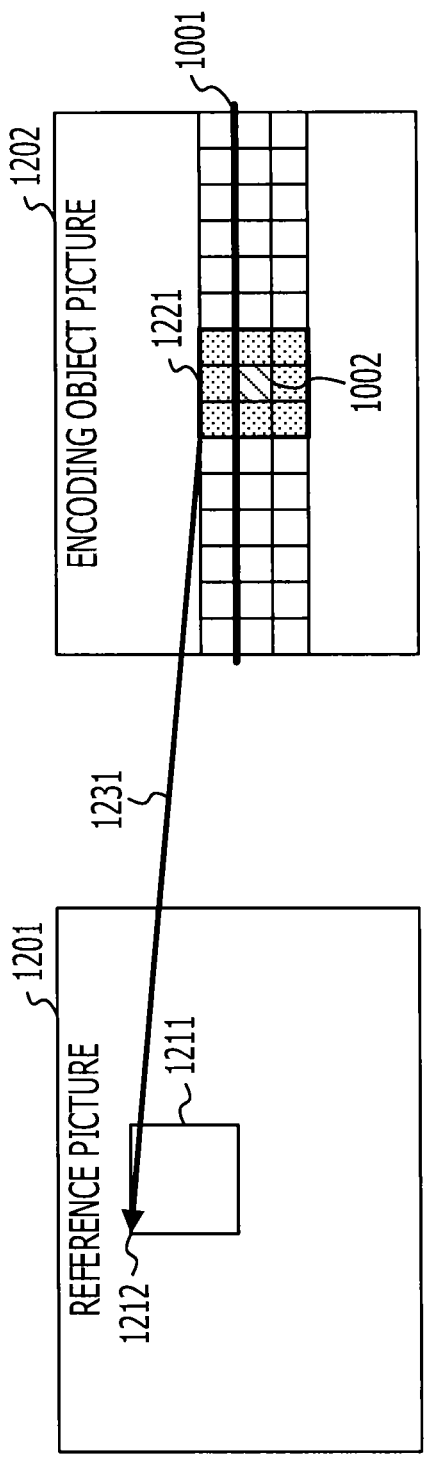
FIG. 12 illustrates a motion trend block.

FIG. 12 illustrates an example of a motion trend block in an encoding object picture. When an encoding object block 1002 is positioned immediately below a slice boundary 1001 in an encoding object picture 1202, a motion trend block 1221 in which the encoding object block 1002 is positioned on the center thereof is provided. The motion trend block 1221 includes the encoding object block 1002 and eight blocks which are positioned on the periphery of the encoding object block 1002.

In region motion vector search, a search point 1212 of a region 1211 in which a motion trend ME cost becomes minimum in a reference picture 1201 is obtained by block matching. Then, a region motion vector 1231 from the motion trend block 1221 to the search point 1212 is obtained.

At this time, a motion trend ME cost TrendCost is calculated by the following formula, for example.

$$TrendCost = \Sigma |TrendPixel - RefPixel| \quad (7)$$

TrendPixel of the formula (7) denotes a pixel value of each pixel in the motion trend block 1221, RefPixel denotes a pixel value of each pixel which is included in a region having the same size in the reference picture 1201, and E denotes a sum of all pixels in the motion trend block 1221. Accordingly, TrendCost of the formula (7) denotes a pixel difference absolute value sum between the motion trend block 1221 and the region in the reference picture 1201.

Obtaining of a motion vector of a wide region over a slice boundary enables extraction of an actual motion trend around the slice boundary.

Meanwhile, in region motion vector search, block matching is not necessarily performed in integer pixel accuracy, but block matching may be performed in coarse accuracy by using an image in a reduced size so as to reduce a calculation amount. For example, the motion trend block 1221 of FIG. 12 is reduced in size to have the one-third size in a vertical direction and also have the one-third size in a horizontal direction, having the size same as that of the encoding object block 1002. In this case, the number of pixels which are to be calculated is reduced by reducing the reference picture 1201 in size to have the one-third size in the vertical and horizontal directions, as well, enabling reduction of the calculation amount of the region motion vector search.

When a region motion vector is obtained irrespective of whether a texture existing in an encoding object block is dense or light, the feature amount calculation unit 1102 and the feature amount determination unit 1103 may be omitted.

When an encoding object block does not belong to a block line positioned immediately below a slice boundary or when it is determined that a texture is present in the encoding object block, the prediction vector decision unit 1106 obtains a prediction vector from a motion vector of one or more encoded blocks positioned around the encoding object block. Then, the prediction vector decision unit 1106 outputs the obtained prediction vector to the motion vector search unit 902.

For example, when median prediction same as a calculation method of a prediction vector of a P picture is employed, a prediction vector mvp of the encoding object block 201 is obtained by using motion vectors of the block A, the block B, and the block C which are depicted in FIG. 2, as following.

Step 1: When all of the block A, the block B, and the block C are not available, mvp=0.

Step 2: When the block B and the block C are not available and the block A is available, refIdxB of the block B and refIdxC of the block C are handled as refIdx equal to refIdxA of the block A. Further, mvB of the block B and mvC of the block C are handled as my equal to mvA of the block A. Then, mvA which is a median value of mvA, mvB, and mvC is assigned for mvp.

Step 3: When only one of refIdxA of the block A, refIdxB of the block B, and refIdxC of the block C is equal to refIdx, a motion vector of a block which is represented by the reference index is assigned for mvp.

Step 4: When any of step 1 to step 3 does not correspond, a median value of mvA, mvB, and mvC is assigned for mvp.

The motion vector search unit 902 obtains a search point of a block, at which a ME cost is minimum within the reference picture, by block matching and obtains a motion vector from the encoding object block to the search point. Then, the motion vector search unit 902 outputs the ME cost and the motion vector to the selection unit 905.

A ME cost includes a cost dependent on a pixel difference and a cost dependent on a difference vector. As the cost dependent on a pixel difference, a pixel difference absolute value sum SAD of the following formula, for example, is used.

$$SAD = \Sigma |Pixel - RefPixel| \quad (8)$$

Pixel of the formula (8) denotes a pixel value of each pixel in an encoding object block, RefPixel denotes a pixel value of each pixel which is included in a block in a reference picture, and E denotes a sum of all pixels in the encoding object block. Accordingly, SAD of the formula (8) denotes a pixel difference absolute value sum between the encoding object block and a block in the reference picture which is indicated by a motion vector.

At this time, a ME cost is calculated by the following formula, for example.

$$MVD = MV - PMV \quad (9)$$

$$ME\ \text{cost} = SAD + \lambda \cdot MVCost(MVD) \quad (10)$$

MV of the formula (9) denotes a motion vector from an encoding object block to a search point, PMV denotes a prediction vector which is outputted from the prediction vector generation unit 901, and MVD denotes a difference vector between a motion vector MV and a prediction vector PMV. λ of the formula (10) is a scale parameter, and function MVCost (MVD) is a function for returning a value based on an estimation bit amount of a difference vector MVD when the difference vector MVD is inputted.

A prediction vector which is outputted from the region motion vector search unit 1105 of the prediction vector generation unit 901 is denoted as PMV1 and a prediction vector which is outputted from the prediction vector decision unit 1106 is denoted as PMV2. At this time, the motion vector search unit 902 obtains a motion vector, at which the ME cost becomes minimum, by using the prediction vector PMV1 or the prediction vector PMV2 as PMV of the formula (9).

Figure 13:
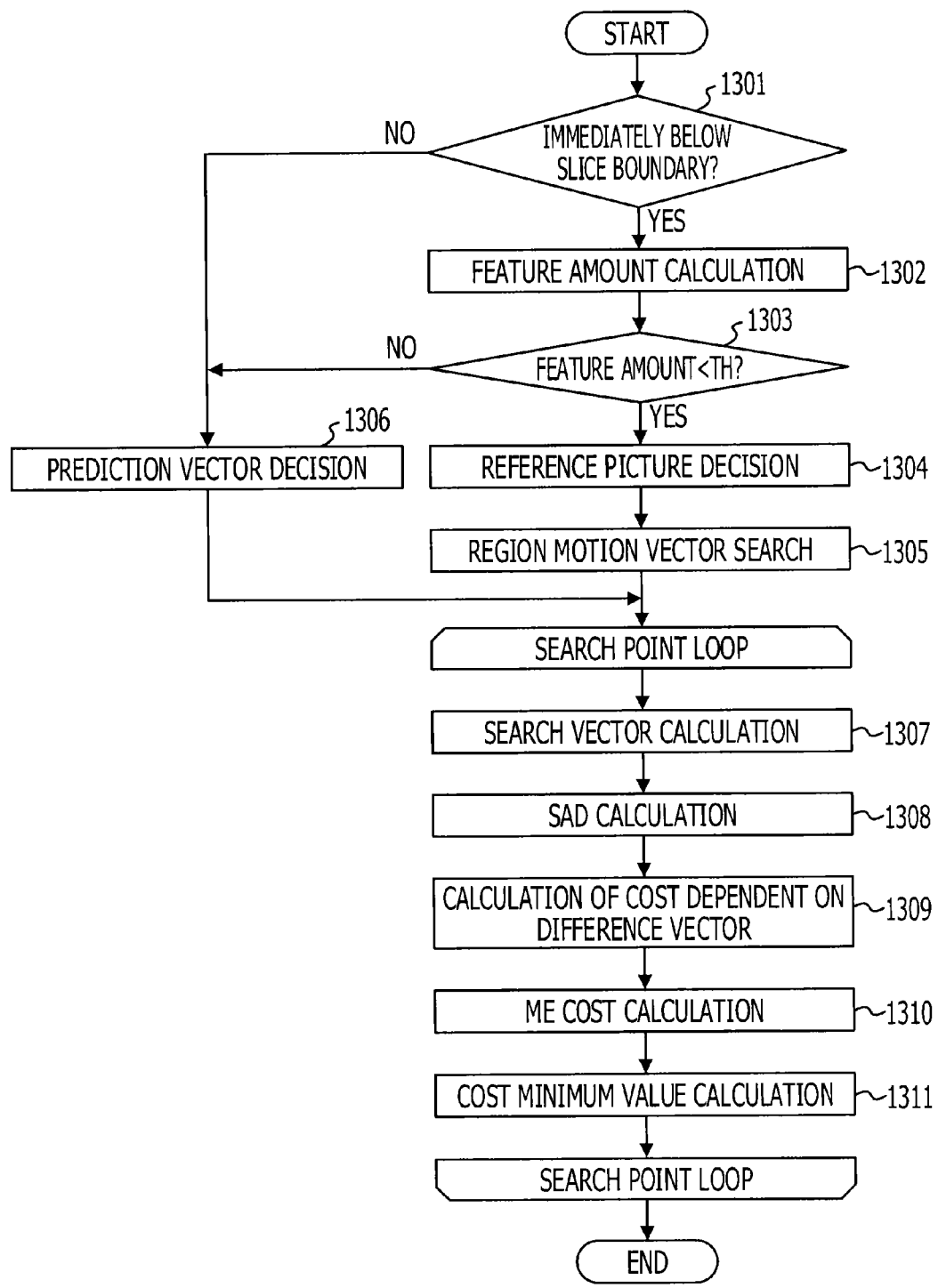
FIG. 13 is a flowchart of first motion search processing which is performed by a prediction vector generation unit and a motion vector search unit.

FIG. 13 is a flowchart illustrating an example of motion search processing which is performed by the prediction vector generation unit 901 and the motion vector search unit 902 of FIG. 11. The block determination unit 1101 of the prediction vector generation unit 901 first determines whether or not an encoding object block belongs to a block line positioned immediately below a slice boundary, on the basis of block position information and slice information (step 1301).

When the encoding object block belongs to the block line positioned immediately below the slice boundary (step 1301, YES), the feature amount calculation unit 1102 obtains a feature amount of the encoding object block (step 1302). Then, the feature amount determination unit 1103 compares the feature amount with a threshold value TH (step 1303).

When the feature amount is smaller than TH (step 1303, YES), the reference picture decision unit 1104 decides a reference picture which is to be used for search of a region motion vector (step 1304). Then, the region motion vector search unit 1105 searches a region motion vector by using the reference picture (step 1305).

On the other hand, when the encoding object block does not belong to the block line positioned immediately below the slice boundary (step 1301, NO), the prediction vector decision unit 1106 obtains a prediction vector from motion vectors of encoded blocks positioned around the encoding object block (step 1306). In a case where the feature amount is equal to or larger than TH (step 1303, NO), as well, the prediction vector decision unit 1106 performs the processing of step 1306.

Subsequently, the motion vector search unit 902 repeats processing of a search point loop so as to obtain a motion vector corresponding to the minimum ME cost. In the processing of the search point loop, the motion vector search unit 902 first decides a search point in a reference picture and obtains a motion vector (search vector) from the encoding object block to the search point (step 1307). Then, the motion vector search unit 902 calculates a pixel difference absolute value sum (SAD) between the encoding object block and a block, which is indicated by the search vector, in a reference picture (step 1308).

Subsequently, the motion vector search unit 902 calculates a cost MVCost(MVD) dependent on a difference vector between the search vector and a prediction vector (step 1309) and calculates a ME cost from the SAD and the MVCost (MVD) (step 1310). Then, the motion vector search unit 902 decides a search vector corresponding to the minimum ME cost among search vectors which have been obtained up here as a motion vector (step 1311).

Processing from step 1307 to step 1311 are repeated for a plurality of search points in the reference picture, thus obtaining a motion vector at which the ME cost becomes minimum as a result.

Thus, motion search is performed by using a region motion vector of a wide region over a slice boundary as a prediction vector, being able to obtain a motion vector reflecting an actual motion trend in the periphery of the slice boundary. When encoding processing is performed by using this motion vector, a possibility that a motion which is different from an actual motion is encoded is decreased, being able to suppress deterioration of a subjective image quality. Accordingly, it becomes hard that the slice boundary is visually recognized.

The motion vector generation unit 903 obtains a skip vector in a skip encoding mode on the basis of block position information and slice information and outputs the skip vector to the cost calculation unit 904. As described with reference to FIG. 2, when any of the following conditions for still determination is true, a skip vector in the PSKIP mode is set to be a zero vector.

(1) The block A is not available.
(2) The block B is not available.
(3) refIdxA of the block A is 0 and both components of mvA are 0.
(4) refIdxB of the block B is 0 and both components of mvB are 0.

When any one of the above-mentioned conditions (1) to (4) is not true, a prediction vector is assigned for a skip vector.

The cost calculation unit 904 calculates a skip cost which is an encoding cost in the skip encoding mode, on the basis of a skip vector and outputs the skip cost and the skip vector to the selection unit 905.

A calculation method of a skip cost is similar to that in the case of a ME cost. However, a skip vector is not encoded, so that a cost dependent on a difference vector is 0. However, when a skip encoding mode is selected, encoding efficiency is increased. Therefore, a negative cost is set instead of MVCost (MVD) of the formula (10). In this case, a skip cost is calculated by the following formula, for example.

$$\text{Skip cost} = SAD - \lambda \cdot k \quad (11)$$

SAD of the formula (11) denotes a pixel difference absolute value sum between an encoding object block and a block in a reference picture which is indicated by a skip vector. Further, k denotes a positive constant number.

The selection unit 905 compares a ME cost which is outputted from the motion vector search unit 902 with a skip cost which is outputted from the cost calculation unit 904 so as to select an encoding mode with a smaller cost as an encoding mode for encoding an encoding object block. Accordingly, when the ME cost is smaller, the ME encoding mode is selected. When the skip cost is smaller, the skip encoding mode is selected.

Then, the selection unit 905 obtains a block cost which is a selected encoding cost of the encoding object block by the following formula.

$$\text{Block cost} = \text{Min}(ME \text{ cost}, \text{skip cost}) \quad (12)$$

Min(x,y) of the formula (12) denotes a function for returning the minimum values of x and y.

Figure 14:
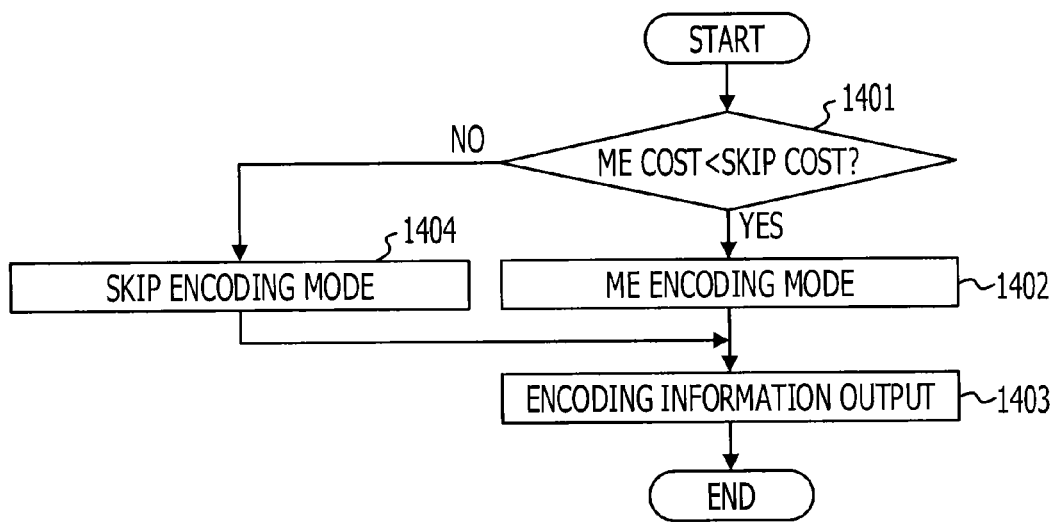
FIG. 14 is a flowchart of selection processing.

FIG. 14 is a flowchart illustrating an example of selection processing which is performed by the selection unit 905. The selection unit 905 first compares a ME cost with a skip cost (step 1401). When the ME cost is smaller than the skip cost, the selection unit 905 selects a ME encoding mode (step 1402). When the ME cost is equal to or larger than the skip cost, the selection unit 905 selects a skip encoding mode (step 1404). Then, the selection unit 905 outputs the selected encoding mode and encoding information which includes a reference index in the encoding mode and a motion vector to the motion compensation unit 809 (step 1403).

In a case where an encoding object block belongs to a block line positioned immediately below a slice boundary, this case corresponds to the above-described condition (2) "the macro block B is not available" and thus a skip vector is a zero vector. As a result, SAD of the formula (11) has a quite large value, and it is considered that a skip cost is to be increased.

On the other hand, MV of the formula (9) is a motion vector reflecting an actual motion trend in the periphery of the slice boundary, so that SAD of the formula (10) has a relatively small value. Accordingly, it is considered that there is high possibility that the ME cost becomes smaller than the skip cost even if MVCost(MVD) is taken into account.

Thus, when an encoding object block belongs to a block line positioned immediately below a slice boundary, a ME encoding mode is more likely to be selected than a skip encoding mode. Accordingly, it is suppressed that a motion vector immediately below the slice boundary is mandatorily set to be a zero vector. Thus, it becomes hard for the slice boundary to be visually recognized.

Here, an encoding mode and a motion vector CMV which are outputted from the selection unit 905 are used in actual encoding processing. When the motion vector CMV is a motion vector which is obtained by the motion vector search unit 902, the prediction vector PMV1 which is used in the motion vector search unit 902 is different from a prediction vector PMV which is to be used in the encoding processing. Therefore, it is considered that the number of bits for encoding of a motion vector is increased, but a motion trend represented by the motion vector CMV is correct.

Further, the motion vector CMV is used as a prediction vector PMV in encoding processing, which is subsequently carried out, of a block on the immediate right. A motion trend of the motion vector CMV is similar to that of the prediction vector PMV1, so that a motion trend of the prediction vector PVM of the right block is also similar to that of the prediction vector PMV1. Accordingly, in blocks on the right side, an error between the prediction vector PMV and the prediction vector PMV1 is small and the number of bits for encoding of a motion vector minimally increased.

The processing of a case where an encoding object picture is a P picture is mainly described in the above embodiment, but it is possible to determine an encoding mode in a similar manner in a case where an encoding object picture is a B picture, as well. Further, it is possible to execute encoding processing of a plurality of slices in parallel by providing the configuration depicted in FIG. 8 for every slice.

The region motion vector search unit 1105 of FIG. 11 sets a motion trend block for every encoding object block and obtains a region motion vector representing a motion of the corresponding motion trend block. However, a region over the slice boundary may be set as one search block, being able to use a region motion vector common in a plurality of encoding object blocks. Further, a motion vector representing an average motion of the whole encoding object picture may be set as a region motion vector.

Figure 15:
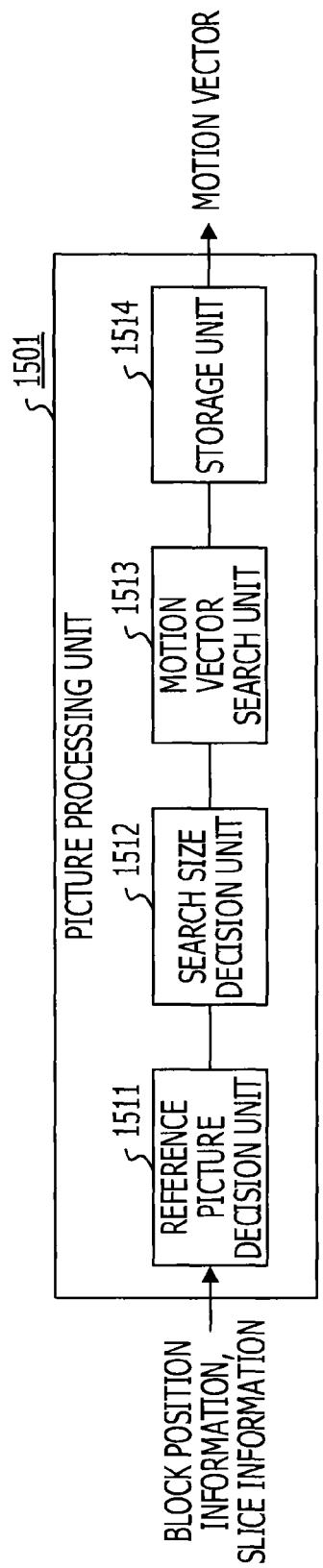
FIG. 15 is a configuration diagram of a picture processing unit.

FIG. 15 illustrates a configuration example of a picture processing unit which obtains such motion vector. A picture processing unit 1501 of FIG. 15 is provided in the mode decision unit 810 of FIG. 9 and includes a reference picture decision unit 1511, a search size decision unit 1512, a motion vector search unit 1513, and a storage unit 1514.

The reference picture decision unit 1511 selects one reference picture from a plurality of candidates of a reference picture and outputs the selected reference picture to the search size decision unit 1512. At time when an encoding object picture is inputted, each block in the encoding object picture has not been encoded yet. Therefore, it is hard to select one reference picture from reference pictures of blocks around each block, unlike the reference picture decision unit 1104 of FIG. 11. Therefore, the reference picture decision unit 1511 selects a predetermined reference picture.

A reference index which is outputted from the selection unit 905 has a strong tendency to indicate the most similar reference picture to an encoding object picture as a result. Therefore, it is preferable to use the most similar reference picture to an encoding object picture when a region motion vector is obtained. Accordingly, the reference picture decision unit 1511 selects a reference picture which is temporally closest to an encoding object picture, for example.

Figure 16:
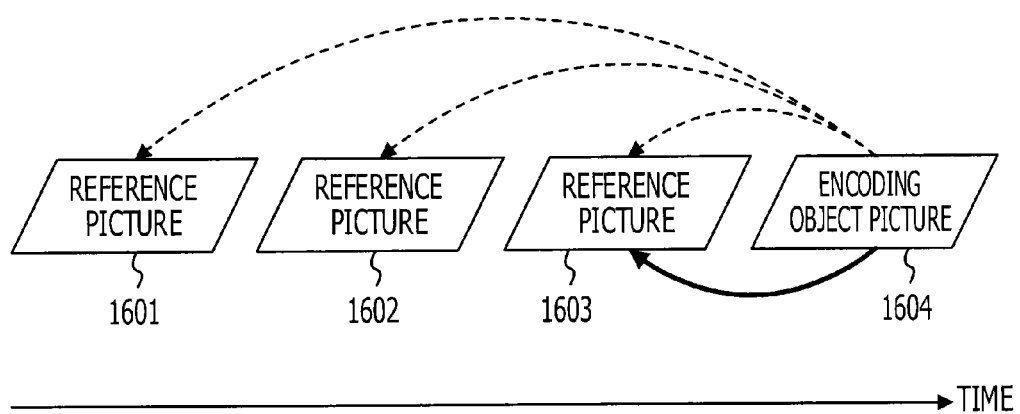
FIG. 16 illustrates a method for deciding a reference picture.

FIG. 16 illustrates such reference picture decision method. Reference pictures 1601 to 1603 are candidates of a reference picture with respect to an encoding object picture 1604. The reference picture 1601 is temporally-farthest to the encoding object picture 1604 among the reference pictures 1601 to 1603. When the reference picture 1603 is temporally closest, the reference picture 1603 is selected.

The search size decision unit 1512 divides an encoding object picture into a plurality of regions having a larger size than a block. Reduction of a calculation amount of encoding processing in a block unit is desired in a moving image encoding device of a real time type, so that it is preferable to use a region having a larger size than a block.

The motion vector search unit 1513 obtains a motion vector representing a motion of a corresponding region, for every region obtained through the division, and stores the motion vector in the storage unit 1514. The motion vector search unit 1513 may obtain an average motion vector representing an average of motion vectors of the whole regions in the encoding object picture and store the average motion vector in the storage unit 1514. A motion vector which is stored in the storage unit 1514 is acquired by the region motion vector search unit 1105 of FIG. 11 and is used as a region motion vector.

In a case where the picture processing unit 1501 is provided, the reference picture decision unit 1104 may be omitted in the prediction vector generation unit 901 of FIG. 11.

Figure 17:
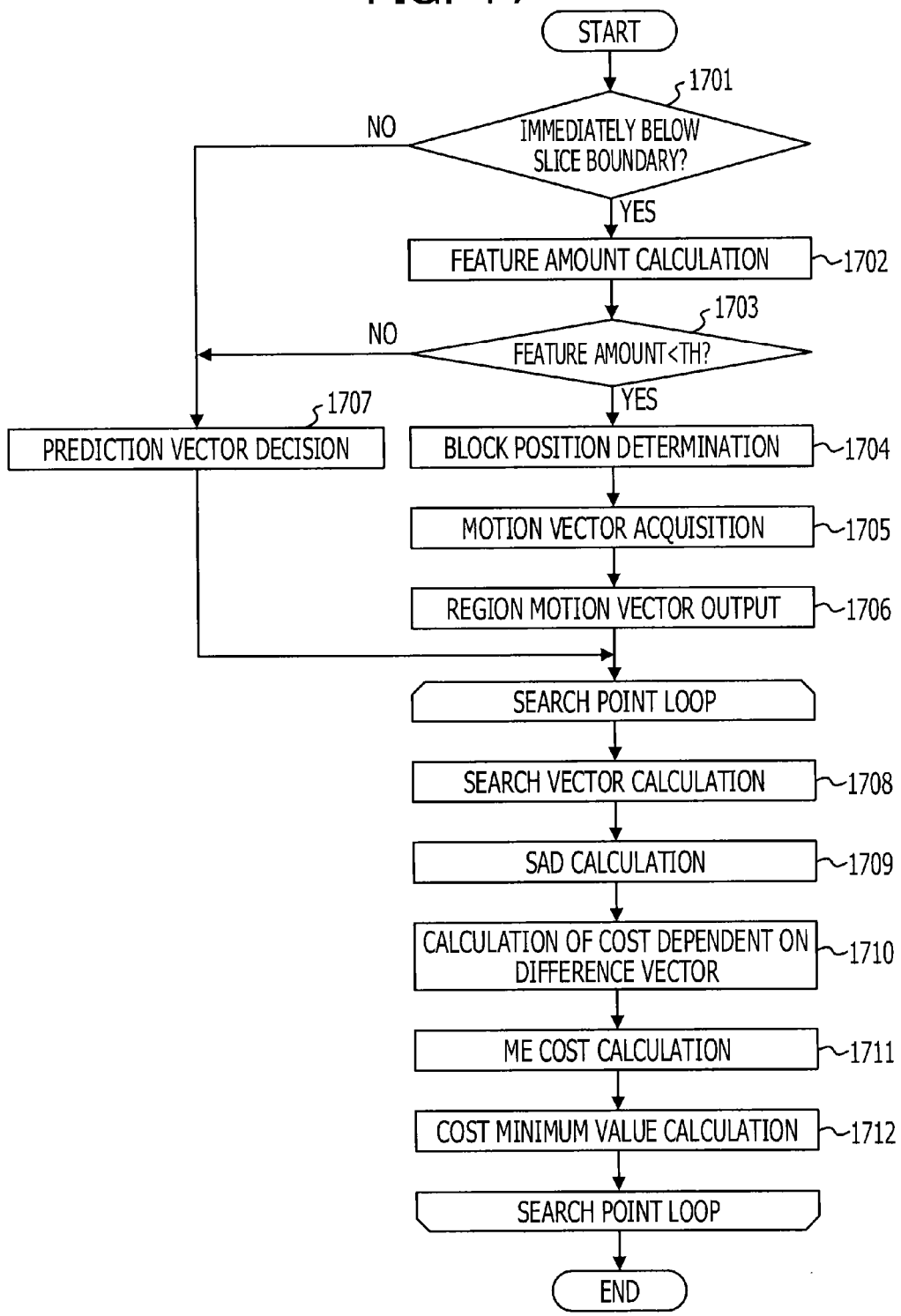
FIG. 17 is a flowchart of second motion search processing in which a picture processing unit is used.

FIG. 17 is a flowchart illustrating an example of motion search processing in which the picture processing unit 1501 is used. Processing of steps 1701 to 1703, processing of step 1707, and processing of steps 1708 to 1712 of FIG. 17 are respectively similar to the processing of steps 1301 to 1303, the processing of step 1306, and the processing of steps 1307 to 1311 of FIG. 13.

When a feature amount is smaller than TH (step 1703, YES), the region motion vector search unit 1105 determines which region a position of an encoding object block is included among regions obtained through division by the search size decision unit 1512 (step 1704). Then, the region motion vector search unit 1105 acquires a motion vector of a region including the position from the storage unit 1514 (step 1705) and outputs the motion vector as a region motion vector (prediction vector) (step 1706).

Here, when an average motion vector is stored in the storage unit 1514 instead of a motion vector of a region including an encoding object block, the region motion vector search unit 1105 outputs the average motion vector as a region motion vector (prediction vector).

In the above-described embodiment, motion vector search is performed to obtain a region motion vector. However, a calculation amount of block matching which is used in the motion vector search is large, so that a method for obtaining a region motion vector without performing the motion vector search is desired.

For example, an average motion vector representing an average motion of encoded blocks is obtained on the basis of motion vectors of encoded blocks positioned around an encoding object block and the average motion vector is used as a region motion vector, being able to omit region motion vector search. However, when peripheral blocks of the encoding object block belong to another slice, it is assumed that encoding processing of the slice has been completed.

Figure 18:
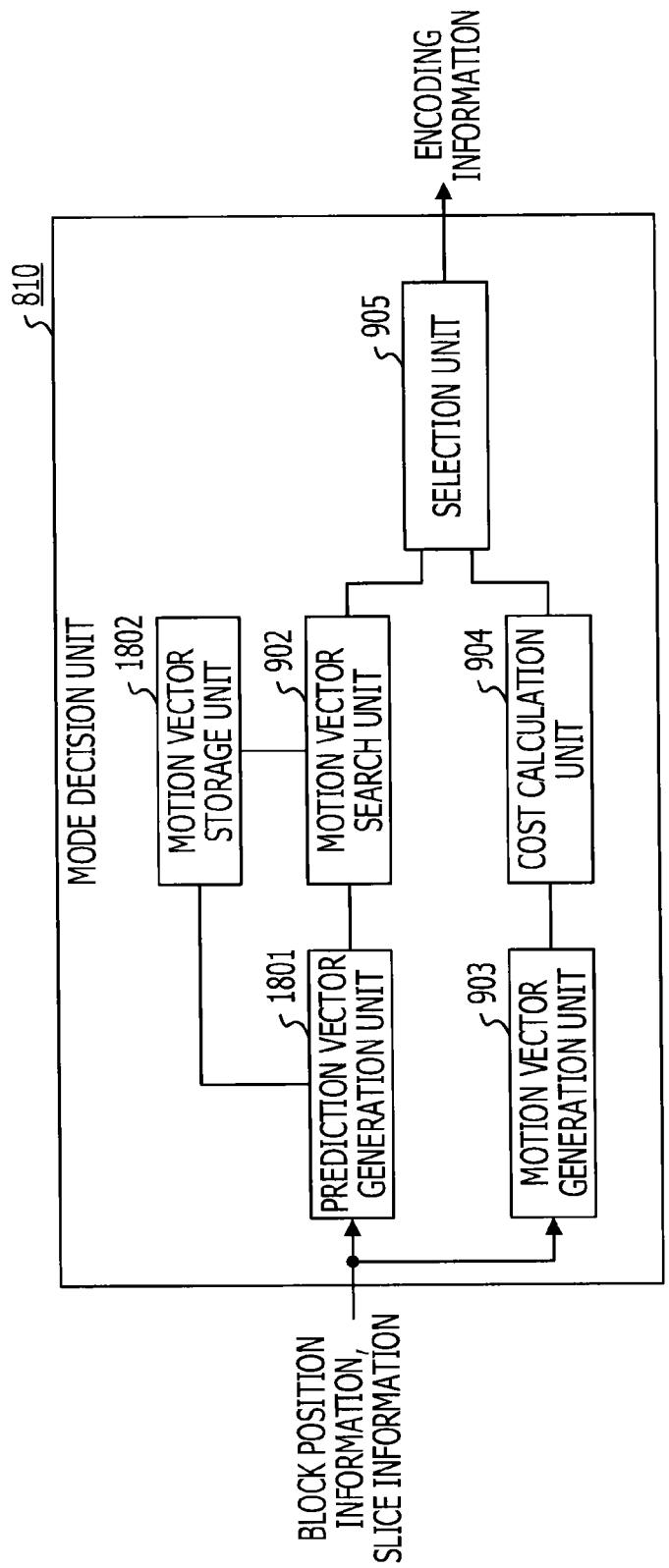
FIG. 18 is a configuration diagram of a second mode decision unit.

FIG. 18 illustrates a configuration example of a mode decision unit for obtaining such average motion vector. A mode decision unit 810 of FIG. 18 includes such configuration that a motion vector storage unit 1802 is added while replacing the prediction vector generation unit 901 with the prediction vector generation unit 1801 in the mode decision unit 810 of FIG. 9.

The motion vector search unit 902 obtains a motion vector of each block and stores the motion vector in the motion vector storage unit 1802. Accordingly, motion vectors of encoded blocks positioned in the periphery of the encoding object block are stored in the motion vector storage unit 1802.

Figure 19:
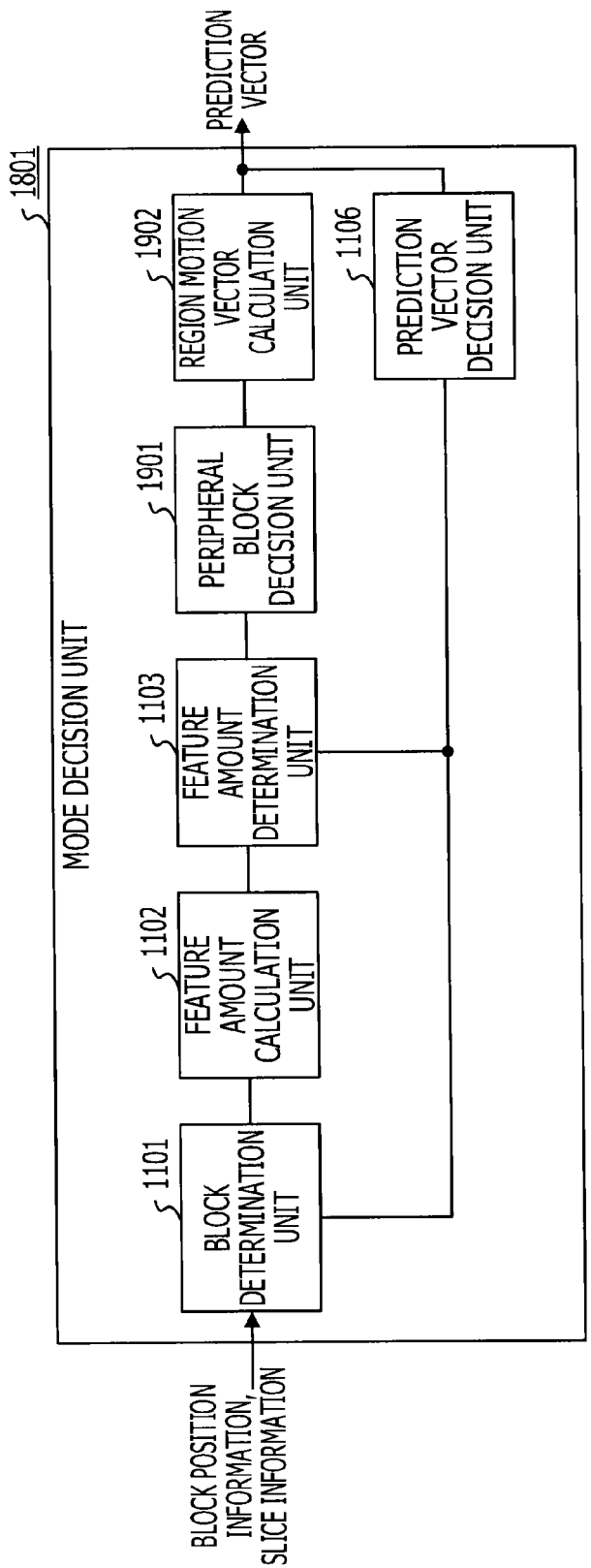
FIG. 19 is a configuration diagram of a second prediction vector generation unit.

FIG. 19 illustrates a configuration example of the prediction vector generation unit 1801 of FIG. 18. The prediction vector generation unit 1801 of FIG. 19 has such configuration that the reference picture decision unit 1104 and the region motion vector search unit 1105 are respectively replaced with a peripheral block decision unit 1901 and a region motion vector calculation unit 1902, in the prediction vector generation unit 901 of FIG. 11.

The peripheral block decision unit 1901 decides a range of peripheral blocks of an encoding object block. For example, the block A, the block B, and the block C which are depicted in FIG. 3 may be set as peripheral blocks.

The region motion vector calculation unit 1902 acquires motion vectors of peripheral blocks from the motion vector storage unit 1802 so as to obtain an average vector of the motion vectors as a region motion vector. For example, when motion vectors of the block A, the block B, and the block C of FIG. 3 are respectively denoted as mvA, mvB, and mvC, an average vector is calculated by the following formula.

$$\text{Average vector} = (mvA + mvB + mvC)/3 \tag{13}$$

Figure 20:
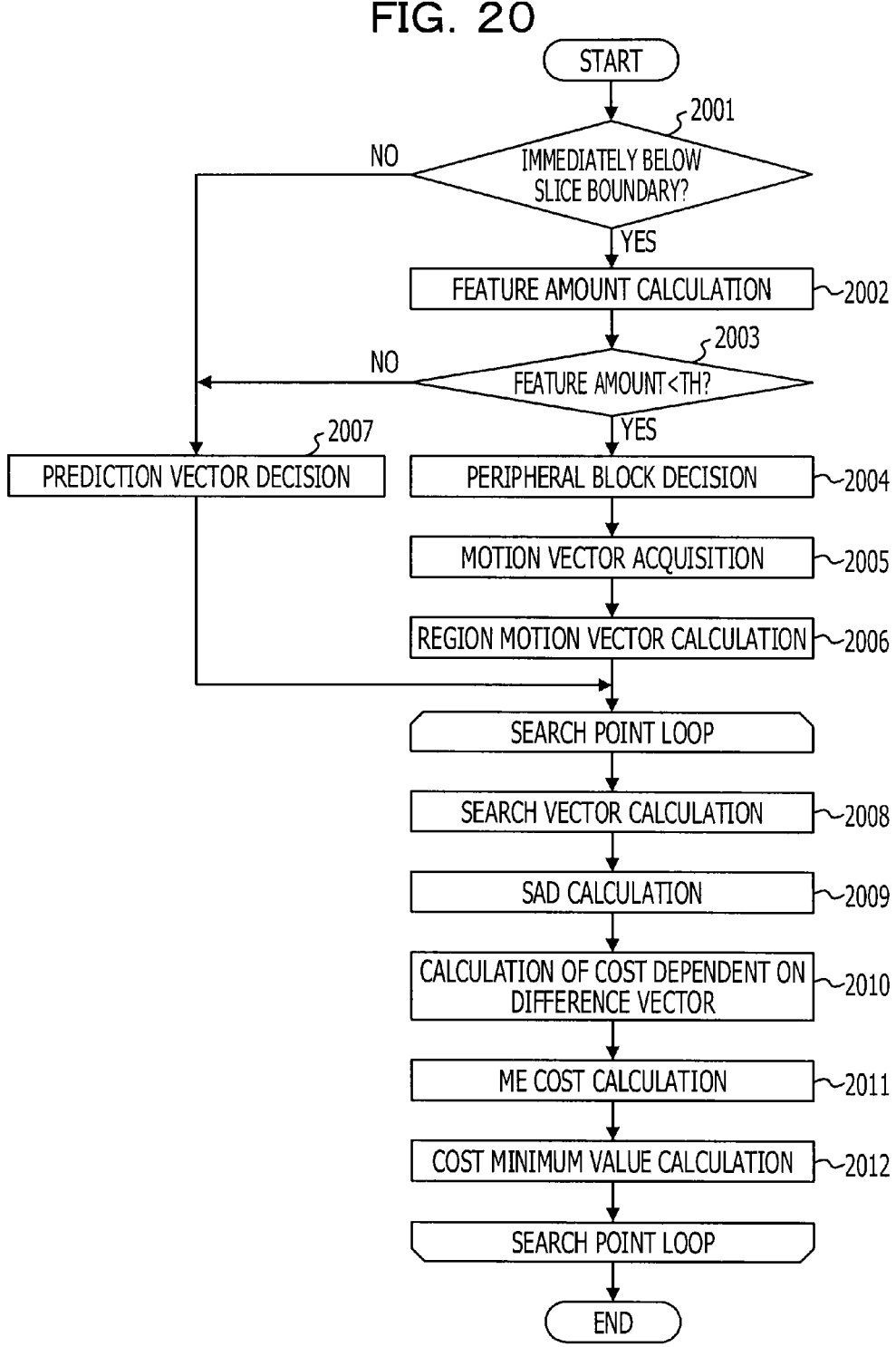
FIG. 20 is a flowchart of third motion search processing which is performed by a prediction vector generation unit and a motion vector search unit.

FIG. 20 is a flowchart illustrating an example of motion search processing which is performed by the prediction vector generation unit 1801 and the motion vector search unit 902 of FIG. 18. Processing of steps 2001 to 2003, processing of step 2007, and processing of steps 2008 to 2012 of FIG. 20 are respectively similar to the processing of steps 1301 to 1303, the processing of step 1306, and the processing of steps 1307 to 1311 of FIG. 13.

When a feature amount is smaller than TH (step 2003, YES), the peripheral block decision unit 1901 decides a range of peripheral blocks of an encoding object block (step 2004). Then, the region motion vector calculation unit 1902 acquires motion vectors of the peripheral blocks from the motion vector storage unit 1802 (step 2005) and obtains an average vector of these motion vectors as a region motion vector (step 2006).

Here, when the number of peripheral blocks of the encoding object block is only one, the region motion vector calculation unit 1902 uses a motion vector of the peripheral block, instead of an average vector, as a region motion vector.

The flowcharts respectively depicted in FIGS. 13, 14, 17, and 20 are merely examples and part of processing may be omitted or altered in accordance with the configuration of the moving image encoding device and conditions. For example, when a region motion vector is obtained irrespective of whether a texture existing in an encoding object block is dense or light, the processing of step 1302 and the processing of step 1303 of FIG. 13 may be omitted. In this case, the processing of step 1702 and the processing of step 1703 of FIG. 17 and processing of step 2002 and processing of step 2003 of FIG. 20 may be omitted, as well.

Further, peripheral blocks used in prediction encoding are not limited to the block A, the block B, and the block C depicted in FIGS. 2 and 3, but other encoded blocks existing around an encoding object block may be used as peripheral blocks. In this case, a prediction vector may be decided by majority decision on the basis of motion vectors of a plurality of peripheral blocks.

Figure 1:
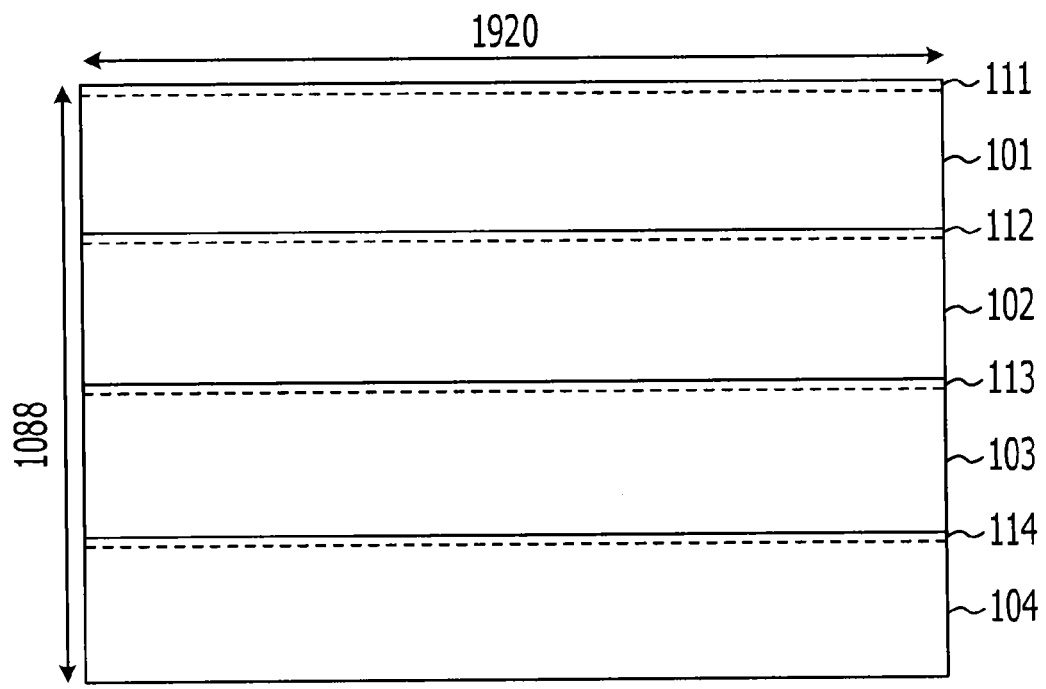
FIG. 1 illustrates slice division.

Further, a picture is divided into four slices by horizontal boundary lines in the slice division of FIG. 1, but a picture may be divided into a plurality of slices by vertical boundary lines. In this case, moving image encoding processing is performed while replacing a block line positioned immediately below a slice boundary with a vertical block line positioned on the immediately right or the immediately left of the slice boundary.

Figure 21:
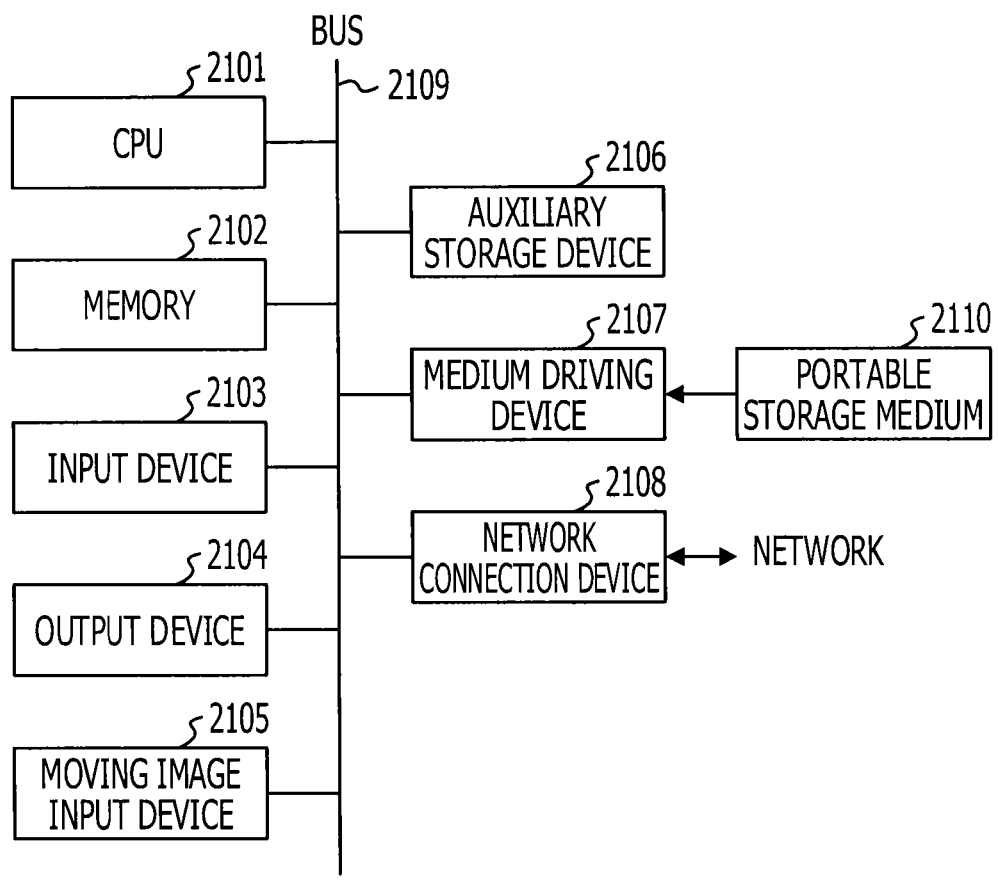
FIG. 21 is a configuration diagram of an information processing device.

The moving image encoding device of FIGS. 6 and 8 may be implemented as a hardware circuit or may be realized by using an information processing device (computer) depicted in FIG. 21.

An information processing device of FIG. 21 includes a central processing unit (CPU) 2101, a memory 2102, an input device 2103, an output device 2104, a moving image input device 2105, an auxiliary storage device 2106, a medium driving device 2107, and a network connection device 2108. These elements are mutually connected via a bus 2109.

The memory 2102 is a semiconductor memory such as a read only memory (ROM), a random access memory (RAM), and a flash memory, for example, and stores a program and data which are used for processing. The memory 2102 may be used as the storage unit 808 of FIG. 8, the storage unit 1514 of FIG. 15, or the motion vector storage unit 1802 of FIG. 18, as well. The CPU (processor) 2101 executes a program by using the memory 2102, for example, so as to perform moving image encoding processing.

The input device 2103 is a keyboard, a pointing device, and the like, for example, and is used for input of an instruction and information from a user or an operator. The output device 2104 is a display device, a printer, a speaker, and the like, for example, and is used for output of an inquiry and a processing result to a user or an operator. To the moving image input device 2105, a picture column of an encoding object is inputted.

The auxiliary storage device 2106 is a magnetic disk device, an optical disk device, a magneto optical disk device, a tape device, or the like, for example. This auxiliary storage device 2106 includes a hard disk drive, as well. The information processing device may store a program and data in the auxiliary storage device 2106 and may load the program and the data on the memory 2102 to use the program and the data.

The medium driving device 2107 drives a portable storage medium 2110 so as to access a record content of the portable storage medium 2110. The portable storage medium 2110 is a memory device, a flexible disk, an optical disk, a magneto optical disk, or the like. Examples of this portable storage medium 2110 include a compact disk read only memory (CD-ROM), a digital versatile disk (DVD), a universal serial bus (USB) memory, and the like, as well. A user or an operator may store a program or data in this portable storage medium 2110 and load the program and the data on the memory 2102 to use the program and the data.

Thus, examples of a computer readable storage medium which stores a program and data which are used for various processing include a physical (non-transitory) storage medium such as the memory 2102, the auxiliary storage device 2106, and the portable storage medium 2110.

The network connection device 2108 is a communication interface which is connected to a communication network such as a local area network (LAN) and Internet and performs data conversion associated with communication. A bit stream of an encoding result is transmitted to a receiver or a moving image decoding device via the network connection device 2108. The information processing device may receive a program and data from an outside device via the network connection device 2108 and load the program and the data on the memory 2102 so as to use the program and the data.

Here, the information processing device does not have to include all of the constituent elements of FIG. 21, and part of the constituent elements may be omitted depending on use application or a condition. For example, when an interface with respect to a user or an operator is not used, the input device 2103 and the output device 2104 may be omitted.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:
1. A moving image encoding device, comprising:
a processor; and
a memory which stores a plurality of instructions, which when executed by the processor, cause the processor to execute,
obtaining a region motion vector that represents a motion of a region including a block in a first slice, in a case where an encoding object block is included in a block line in a second slice, the block line contacting with a boundary between the first slice and the second slice in an encoding object picture, the encoding object picture being divided into a plurality of slices each of which includes a plurality of blocks;

obtaining a motion vector of the encoding object block by using the region motion vector as a first prediction vector of the encoding object block;

obtaining a second prediction vector from a motion vector of one or more encoded blocks that is or are positioned around the encoding object block; and obtaining an encoding result by encoding a difference vector between the motion vector of the encoding object block and the second prediction vector and encoding a difference between a pixel value of the encoding object block and a pixel value of a block in a reference picture that is represented by the motion vector of the encoding object block.

2. The device according to claim 1, further comprising:

obtaining a motion vector of the encoding object block in a skip encoding mode in which the difference vector is not encoded;

calculating an encoding cost of the encoding object block in the skip encoding mode, on the basis of the motion vector of the encoding object block in the skip encoding mode; and selecting either one encoding mode between an encoding mode in which the difference vector is encoded and the skip encoding mode;

wherein an encoding cost of the encoding object block in the encoding mode in which the difference vector is encoded is calculated by using the first prediction vector as a prediction vector of the encoding object block, in the obtaining a motion vector, wherein an encoding mode in which an encoding cost of the encoding object block is lower is selected in the selecting, and wherein the encoding object block is encoded in accordance with a selected encoding mode in the obtaining an encoding result.

3. The device according to claim 1, wherein the region motion vector that represents a motion of the region including a block in the first slice and the encoding object block is obtained in the obtaining a region motion vector.

4. The device according to claim 3, further comprising:

obtaining motion vectors that represent motions of respective regions by dividing the encoding object picture into a plurality of regions that have a size bigger than that of the block;

wherein a motion vector that represents a motion of a region including the encoding object block is obtained as the region motion vector, among the motion vectors of the plurality of regions, the motion vectors being obtained in the obtaining motion vectors that represent motions of respective regions, in the obtaining a region motion vector.

5. The device according to claim 3, wherein a motion vector that represents an average motion of a whole of the encoding object picture is obtained as the region motion vector in the obtaining a region motion vector.

6. The device according to claim 1, wherein an average motion vector based on a motion vector of one or more encoded blocks positioned around the encoding object block is obtained as the region motion vector in the obtaining a region motion vector.

7. The device according to claim 1, wherein the second prediction vector is obtained from a motion vector of one or more encoded blocks positioned around the encoding object block in the obtaining a region motion vector when the encoding object block is included in a block line other than a block line that contacts with the boundary, in the second slice, and a motion vector of the encoding object block is obtained by using the second prediction vector as a prediction vector of the encoding object block in the obtaining a motion vector.

8. The device according to claim 1, wherein a feature amount of the encoding object block is obtained when the encoding object block is included in a block line, the block line contacting with the boundary, in the second slice, and the region motion vector is obtained when the feature amount is lower than a threshold value, in the obtaining a region motion vector.

9. The device according to claim 1, wherein the region motion vector that represents a motion of the region with respect to a reference picture that is selected most frequent times in a plurality of encoded blocks that are positioned around the encoding object block is obtained, among a plurality of reference pictures, in the obtaining a region motion vector.

10. The device according to claim 1, wherein the region motion vector that represents a motion of the region with respect to a reference picture that is temporally closest to the encoding object picture, among a plurality of reference pictures, in the obtaining a region motion vector.

11. The device according to claim 1, further comprising:

obtaining a motion vector of the encoding object block in an encoding mode in which the difference vector is not encoded;

calculating an encoding cost of the encoding object block in the encoding mode in which the difference vector is not encoded, on the basis of the motion vector of the encoding object block in the encoding mode in which the difference vector is not encoded; and selecting either one encoding mode between an encoding mode in which the difference vector is encoded and the encoding mode in which the difference vector is not encoded, wherein an encoding cost of the encoding object block in the encoding mode in which the difference vector is encoded is calculated by using the first prediction vector as a prediction vector of the encoding object block, in the obtaining a motion vector, an encoding mode in which an encoding cost of the encoding object block is lower is selected in the selecting, and the encoding object block is encoded in accordance with a selected encoding mode in the obtaining an encoding result.

12. A moving image encoding method, comprising:

obtaining a region motion vector, by a computer processor, that represents a motion of a region including a block in a first slice, in a case where an encoding object block is included in a block line in a second slice, the block line contacting with a boundary between the first slice and the second slice in an encoding object picture, the encoding object picture being divided into a plurality of slices each of which includes a plurality of blocks;

obtaining a motion vector of the encoding object block by using the region motion vector as a first prediction vector of the encoding object block;

obtaining a second prediction vector from a motion vector of one or more encoded blocks that is or are positioned around the encoding object block; and obtaining an encoding result by encoding a difference vector between the motion vector of the encoding object block and the second prediction vector and encoding a difference between a pixel value of the encoding object block and a pixel value of a block in a reference picture that is represented by the motion vector of the encoding object block.

13. The method according to claim 12, further comprising:
obtaining a motion vector of the encoding object block in a skip encoding mode in which the difference vector is not encoded;
calculating an encoding cost of the encoding object block in the skip encoding mode, on the basis of the motion vector of the encoding object block in the skip encoding mode; and
selecting either one encoding mode between an encoding mode in which the difference vector is encoded and the skip encoding mode;
wherein an encoding cost of the encoding object block in the encoding mode in which the difference vector is encoded is calculated by using the first prediction vector as a prediction vector of the encoding object block, in the obtaining a motion vector,
wherein an encoding mode in which an encoding cost of the encoding object block is lower is selected in the selecting, and
wherein the encoding object block is encoded in accordance with a selected encoding mode in the obtaining an encoding result.

14. The method according to claim 12, wherein the region motion vector that represents a motion of the region including a block in the first slice and the encoding object block is obtained in the obtaining a region motion vector.

15. The method according to claim 14, further comprising:
obtaining motion vectors that represent motions of respective regions by dividing the encoding object picture into a plurality of regions that have a size bigger than that of the block;
wherein a motion vector that represents a motion of a region including the encoding object block is obtained as the region motion vector, among the motion vectors of the plurality of regions, the motion vectors being obtained in the obtaining motion vectors that represent motions of respective regions, in the obtaining a region motion vector.

16. The method according to claim 14, wherein a motion vector that represents an average motion of a whole of the encoding object picture is obtained as the region motion vector in the obtaining a region motion vector.

17. The method according to claim 12, wherein an average motion vector based on a motion vector of one or more encoded blocks positioned around the encoding object block is obtained as the region motion vector in the obtaining a region motion vector.

18. The method according to claim 12, wherein the second prediction vector is obtained from a motion vector of one or more encoded blocks positioned around the encoding object block in the obtaining a region motion vector when the encoding object block is included in a block line other than a block line that contacts with the boundary, in the second slice, and a motion vector of the encoding object block is obtained by using the second prediction vector as a prediction vector of the encoding object block in the obtaining a motion vector.

19. The method according to claim 12, wherein a feature amount of the encoding object block is obtained when the encoding object block is included in a block line, the block line contacting with the boundary, in the second slice, and the region motion vector is obtained when the feature amount is lower than a threshold value, in the obtaining a region motion vector.

20. The method according to claim 12, wherein the region motion vector that represents a motion of the region with respect to a reference picture that is selected most frequent times in a plurality of encoded blocks that are positioned around the encoding object block is obtained, among a plurality of reference pictures, in the obtaining a region motion vector.

21. A non-transitory computer-readable storage medium storing an image processing program that causes a computer to execute a process comprising:
obtaining a region motion vector that represents a motion of a region including a block in a first slice, in a case where an encoding object block is included in a block line in a second slice, the block line contacting with a boundary between the first slice and the second slice in an encoding object picture, the encoding object picture being divided into a plurality of slices each of which includes a plurality of blocks;
obtaining a motion vector of the encoding object block by using the region motion vector as a first prediction vector of the encoding object block;
obtaining a second prediction vector from a motion vector of one or more encoded blocks that is or are positioned around the encoding object block; and
obtaining an encoding result by encoding a difference vector between the motion vector of the encoding object block and the second prediction vector and encoding a difference between a pixel value of the encoding object block and a pixel value of a block in a reference picture that is represented by the motion vector of the encoding object block.

* * * * *